(12) United States Patent
Ganesan et al.

(10) Patent No.: US 12,507,905 B2
(45) Date of Patent: Dec. 30, 2025

(54) DEVICE AND METHOD FOR REAL TIME ASSESSMENT AND MONITORING OF THORACIC FLUID, AIR TRAPPING AND VENTILATION

(71) Applicant: Anusar Inc., Arlington, VA (US)

(72) Inventors: Sriram Ganesan, Bangalore (IN); Goutam Dutta, Bengaluru (IN); Rahul Shukla, Bengaluru (IN); Jagdish Chander Suri, New Delhi (IN)

(73) Assignee: Anusar Inc., Arlington, VA (US)

( * ) Notice: Subject to any disclaimer, the term of this patent is extended or adjusted under 35 U.S.C. 154(b) by 0 days.

(21) Appl. No.: 19/088,329

(22) Filed: Mar. 24, 2025

(65) Prior Publication Data
US 2025/0302328 A1 Oct. 2, 2025

(30) Foreign Application Priority Data
Mar. 28, 2024 (IN) .............................. 202441025235

(51) Int. Cl.
*A61B 5/0537* (2021.01)
*A61B 5/00* (2006.01)
*A61B 5/145* (2006.01)

(52) U.S. Cl.
CPC .......... *A61B 5/0537* (2013.01); *A61B 5/0022* (2013.01); *A61B 5/14542* (2013.01);
(Continued)

(58) Field of Classification Search
CPC . A61B 5/0537; A61B 5/0022; A61B 5/14542; A61B 5/4878; A61B 5/6833;
(Continued)

(56) References Cited

U.S. PATENT DOCUMENTS

| | | | |
|---|---|---|---|
| 4,870,578 | A | 9/1989 | Vysin et al. |
| 5,282,840 | A | 2/1994 | Hudrlik |

(Continued)

OTHER PUBLICATIONS

J. Ojarand, M. Rist and M. Min, "Enhanced optimization of the wideband excitation signal for a bioimpedance measurement," 2015 IEEE International Instrumentation and Measurement Technology Conference (I2MTC) Proceedings, Pisa, Italy, 2015, pp. 1801-1806 (Year: 2015).*

(Continued)

*Primary Examiner* — Alex M Valvis
*Assistant Examiner* — Jonathan E. Cooper
(74) *Attorney, Agent, or Firm* — Nicola A. Pisano; Cozen O'Connor

(57) ABSTRACT

Systems and methods are providing for detecting and monitoring thoracic fluid, air-trapping and ventilation assessment in real time, wherein data obtained from a non-invasive electrode patch is analyzed using analysis algorithms for an electrical equivalent model that have been personalized for a patient's physiologic characteristics, medical condition and/or historical medical information using machine learning trained on a dataset representative of a large and diverse patient population. The systems and methods provide a simple, real-time, highly sensitive and specific, non-invasive, bedside solution for fluid level assessment, checking for increased air trapping, and ventilation assessment. The described methods include a variety of use cases for the inventive system and methods.

30 Claims, 11 Drawing Sheets

(52) U.S. Cl.
CPC .......... *A61B 5/4878* (2013.01); *A61B 5/6833* (2013.01); *A61B 5/684* (2013.01); *A61B 5/7267* (2013.01); *A61B 5/7282* (2013.01); *A61B 5/746* (2013.01); *A61B 2560/0223* (2013.01); *A61B 2560/0443* (2013.01); *A61B 2562/043* (2013.01)

(58) Field of Classification Search
CPC ..... A61B 5/684; A61B 5/7267; A61B 5/7282; A61B 5/746; A61B 2560/0223; A61B 2560/0443; A61B 2562/043; A61B 5/082; A61B 5/7264; A61B 5/4064; A61B 5/291; A61B 5/369; A61B 2562/227; A61B 5/318; A61B 5/256; A61B 5/441; A61B 5/0006; A61B 5/31; A61B 5/0531; A61B 5/0533; A61B 5/053; A61B 5/486; A61B 5/25; A61B 5/28; A61B 5/296; A61B 5/246; A61B 5/24; A61B 5/308; A61B 5/297; A61B 5/305; A61B 5/313; A61B 5/315; A61B 5/372; A61B 5/389; A61B 5/398; G16H 50/70
USPC .......................................................... 600/547
See application file for complete search history.

(56) References Cited

U.S. PATENT DOCUMENTS

| | | | |
|---|---|---|---|
| 5,335,667 | A | 8/1994 | Cha et al. |
| 5,788,643 | A | 8/1998 | Feldman |
| 6,095,987 | A | 8/2000 | Shmulewitz et al. |
| 6,292,689 | B1 | 9/2001 | Wallace et al. |
| 7,499,745 | B2 | 3/2009 | Littrup et al. |
| 7,907,998 | B2 | 3/2011 | Arad et al. |
| 8,374,688 | B2 | 2/2013 | Libbus et al. |
| 8,744,564 | B2 | 6/2014 | Ward et al. |
| 8,791,349 | B2 | 7/2014 | Chamberlin et al. |
| 8,965,498 | B2 | 2/2015 | Katra et al. |
| 9,451,897 | B2 | 9/2016 | Mazar et al. |
| 9,955,916 | B2 | 5/2018 | Bonomi et al. |
| 10,271,739 | B2 | 4/2019 | Freeman et al. |
| 10,376,176 | B2 | 8/2019 | Wabel et al. |
| 10,667,717 | B2 | 6/2020 | Freeman et al. |
| 10,702,166 | B1 | 7/2020 | Freeman et al. |
| 11,047,821 | B2 | 6/2021 | Ano et al. |
| 11,058,318 | B2 | 7/2021 | Ward et al. |
| 11,116,448 | B1 | 9/2021 | Trapero et al. |
| 11,207,025 | B1 | 12/2021 | Trapero et al. |
| D997,938 | S | 9/2023 | Akl et al. |
| 12,295,733 | B2* | 5/2025 | Clements .............. A61B 5/6833 |
| 2005/0124908 | A1 | 6/2005 | Belalcazar et al. |
| 2005/0215918 | A1 | 9/2005 | Frantz et al. |
| 2006/0085049 | A1* | 4/2006 | Cory .................... A61B 5/4041 607/48 |
| 2006/0258952 | A1* | 11/2006 | Stahmann ............ A61B 5/4878 600/528 |
| 2010/0234716 | A1* | 9/2010 | Engel .................... A61B 5/6833 600/459 |
| 2011/0054343 | A1* | 3/2011 | Chetham .............. A61B 5/0537 600/547 |
| 2011/0301489 | A1* | 12/2011 | Essex .................... A61B 5/4869 600/547 |
| 2012/0165633 | A1* | 6/2012 | Khair ..................... A61B 5/327 600/382 |
| 2013/0116533 | A1* | 5/2013 | Lian ......................... A61B 5/35 600/391 |
| 2013/0165761 | A1* | 6/2013 | De Limon ........... A61B 5/7278 600/382 |
| 2014/0300490 | A1* | 10/2014 | Kotz .................... A61B 5/7267 340/870.3 |
| 2016/0022195 | A1* | 1/2016 | Vardy .................. A61B 5/0537 600/506 |
| 2016/0081585 | A1* | 3/2016 | Halter ................ A61B 10/0233 29/605 |
| 2016/0135741 | A1* | 5/2016 | Chetham .............. A61B 5/0537 600/391 |
| 2018/0000563 | A1* | 1/2018 | Shanjani ................ A61B 5/389 |
| 2020/0260998 | A1* | 8/2020 | Auerbach ................ G06F 1/163 |
| 2021/0330212 | A1 | 10/2021 | Ganesan et al. |
| 2022/0369947 | A1 | 11/2022 | Dutta et al. |
| 2023/0380762 | A1* | 11/2023 | Kuss .................... A61B 5/4848 |
| 2024/0115156 | A1 | 4/2024 | Seo et al. |

OTHER PUBLICATIONS

Q. Hua, Y. Li, M. W. Frost, S. Kold, O. Rahbek and M. Shen, "Machine Learning-Assisted Equivalent Circuit Characterization for Electrical Impedance Spectroscopy Measurements of Bone Fractures," in IEEE Transactions on Instrumentation and Measurement, vol. 73, pp. 1-15, 2024, Art No. 2001515 (Year: 2024).*

Safaee et al.: Bedside monitoring of lung perfusion by electrical impedance tomography in the time of COVID-19. Br J Anaesth. Nov. 2020;125(5):e434-e436.

Brabant et al.: Thoracic Electrical Impedance Tomography—The 2022 Veterinary Consensus Statement. Front Vet Sci. Jul. 22, 2022;9:946911.

Yorkey et al.: Comparing Reconstruction Algorithms for Electrical Impedance Tomography. IEEE Transactions on Biomedical Engineering, vol. BME-34, No. 11, pp. 843-852, Nov. 1987.

De Lorenzo et al.: Predicting body cell mass with bioimpedance by using theoretical methods: a technological review. J Appl Physiol (1985). May 1997;82(5):1542-58.

Ling et al.: Accuracy of direct segmental multi-frequency bioimpedance analysis in the assessment of total body and segmental body composition in middle-aged adult population. Clin Nutr. Oct. 2011;30(5):610-5.

Frerichs et al.: Chest electrical impedance tomography examination, data analysis, terminology, clinical use and recommendations: consensus statement of the TRanslational EIT developmeNt stuDy group. Thorax. Jan. 2017;72(1):83-93.

* cited by examiner

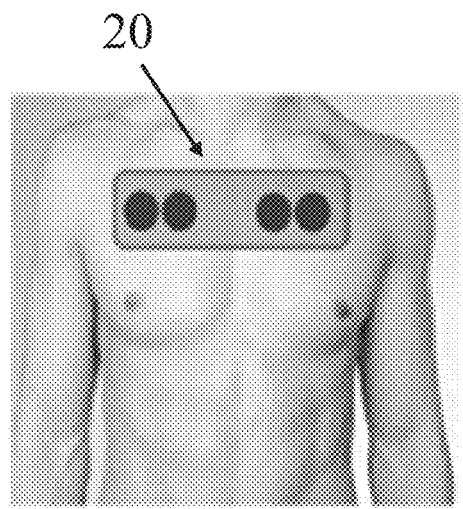
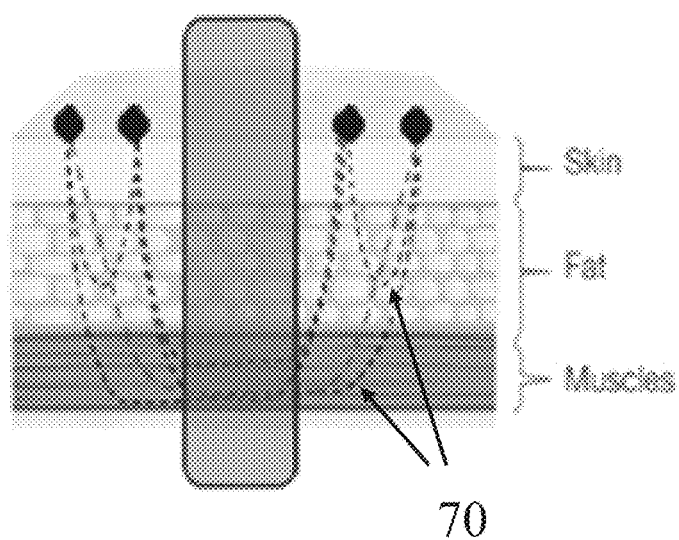
FIG. 9A        FIG. 9B
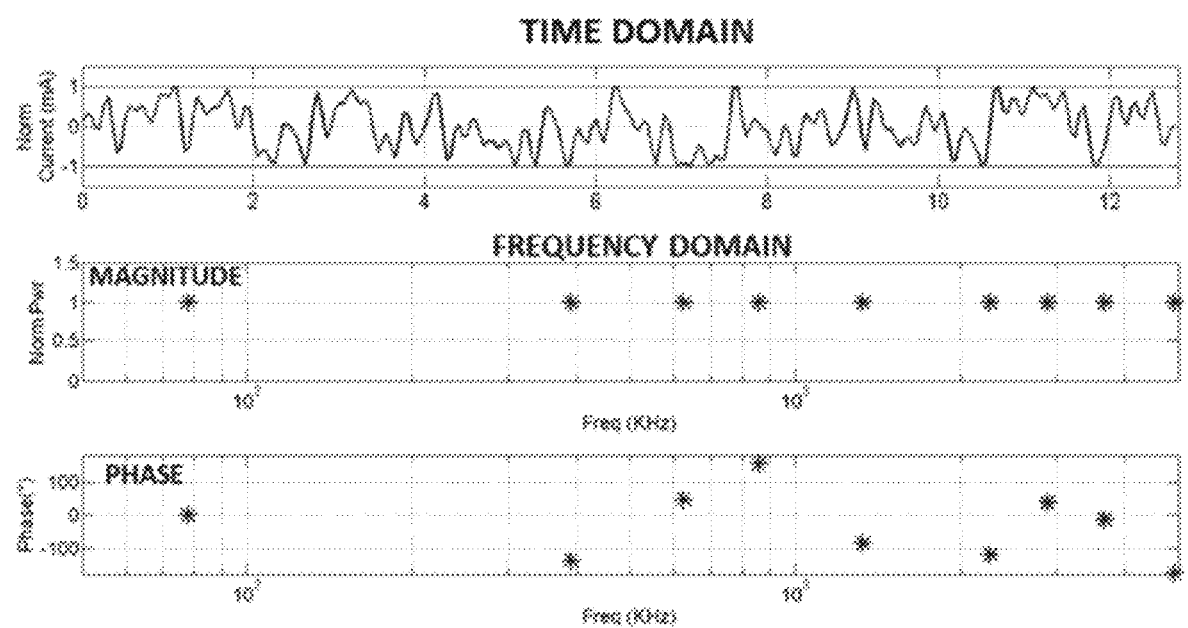
FIG. 10

DEVICE AND METHOD FOR REAL TIME ASSESSMENT AND MONITORING OF THORACIC FLUID, AIR TRAPPING AND VENTILATION

CROSS-REFERENCE TO RELATED APPLICATIONS

This application claims priority to Indian Patent Application number 202441025235, filed on Mar. 28, 2024.

FIELD OF THE INVENTION

The present invention relates to the field of medical devices, and more particularly, a non-invasive device for simultaneous real-time assessment and tracking of thoracic fluid, trapped air, and ventilation status of a patient in critical care settings using tissue responsiveness to a broadband electrical stimulus and a machine learning component.

BACKGROUND

Patients with chronic conditions such as heart failure, chronic obstructive pulmonary disease (COPD), or renal failure are at a high risk of developing life-threatening conditions such as pulmonary edema, respiratory failure, or circulatory shock. Apart from clinical symptoms monitoring, various medical devices are utilized to assess vital parameters including, but not limited to, electrocardiogram (ECG), oxygen saturation, and blood pressure. In some cases, invasive measures, such as vascular catheterization, may be employed for continuous monitoring.

Further, while monitoring crucial vital signs, like heart rate and breathing rate, merely identifying that the vital signs vary above or below a certain level is not specific enough to indicate when clinical intervention is needed. Rather, further tests may be needed before appropriate treatment can be provided when there is a drop in oxygen saturation levels in the blood or significant blood pressure fluctuations.

In addition, right fluid balance and adequate ventilation are crucial aspects of patients in critical care. Depending on the patient's condition, the treatment required to achieve this may vary. For example, some patients might be hypervolemic requiring diuretic treatment to remove fluid, while others might be hypovolemic, requiring intravenous fluid infusion. In many cases, critically sick patients with cardiopulmonary conditions may show drop in oxygen saturation (hypoxemic condition) due to several factors such as compromised ventilation or compromised gas exchange.

In acute conditions, patients are often intubated with a mechanical ventilator, along with oxygen support. Mechanical ventilation improves the airway ventilation providing relief to the patient. However, it is important to assess the exact cause of criticality before providing a therapy to the patient. As an example, a patient may be hypoxic due to inadequate ventilation, pulmonary edema or, due to presence of pulmonary embolism, all of which shall show a deterioration of oxygen saturation in pulse oximetry or, in arterial blood gas analysis. Increasing oxygen concentration in inhaled air or fraction of inspired oxygen (FiO2) provides only temporary relief to such patients unless the root cause is adequately addressed. An increased FiO2 may be toxic to the human body if administered for a prolonged period. It is therefore vital to identify the root cause contributing to the hypoxemic condition.

Monitoring the oxygen saturation alone does not provide sufficient information to determine the cause of hypoxemia; it is important to simultaneously monitor the ventilation status and fluid overload status to obtain an appropriate diagnosis. Air trapping in lungs also needs to be assessed and tracked regularly to monitor the progress of patient recovery in various cases, including but not limited to, acute asthma, exacerbations of emphysema, and chronic bronchitis. For such patients, non-invasive or mechanical ventilation may sometimes lead to significant increase in air trapping, which requires careful clinical monitoring and adjustments in the pressure settings. Further, mechanical ventilation to a patient generally is preceded by resuscitation, in which the patient is infused with saline to maintain sufficient venous pressure so that venous return is not compromised due to the positive pressure applied by the ventilator. In such cases, it is important to assess the fluid status of the patient (whether hypervolemic or hypovolemic) before the resuscitation phase and also to track the fluid status during the resuscitation phase.

Traditionally, fluid level assessment has involved triaging of blood markers such as NTProBNP and multiple imaging modalities, such as X-ray, echocardiogram, CT scan or lung ultrasound, resulting in high diagnostics cost and the need for a radiologist's interpretation, thus leading to increased expenses and long delays in providing the appropriate care. These tests cannot be performed in real time on a patient to be resuscitated prior to ventilation. Similarly, intubated patients who are to be weaned off ventilation support should be drained of excess fluid by administration of diuretics. Further, apart from breathing rate monitoring, current modalities do not provide ventilation assessment or monitoring of the minute ventilation for non-intubated patients.

Patients also may suffer from recurrent or new secondary complications, such as pneumonia, pleural effusion, or pulmonary edema due to acute heart failure, while the patient is in the recovery phase in an ICU or intensive care ward. Accordingly, simultaneously tracking fluid status and ventilation status for such patients during their recovery phase using simple non-invasive means may enable appropriate therapeutic interventions earlier, such as change in diuretic dosage or need for IV fluids or non-invasive ventilation, etc., to improve the overall patient outcome in terms of mortality, length of stay in ICU, duration of mechanical ventilation support, and overall length of hospitalization.

Bioelectrical impedance or "bio-impedance" systems are known for tracking change in fluid levels in the body and selected organs, such as the lungs and heart. For example, U.S. Pat. No. 7,907,998 to Arad (Abboud) describes a bioimpedance apparatus for lung edema using bioimpedance measured using an implanted pacemaker or defibrillator, wherein impedance measurements are taken between a lead and the case of the implanted device. U.S. Patent Application Publication No. US 2005/0124908A1 also describes a system for monitoring thoracic fluids using an implanted device. U.S. Pat. No. 6,292,689 to Wallace et al. describes an intubation tube configured for placement in a patient's trachea or esophagus that includes multiple pairs of electrodes for measuring cardiac output using bioimpedance technology.

Non-invasive bioimpedance systems also are known, e.g., for tracking change in fluid levels in patients suffering from congestive heart failure, in which electrodes are placed on limbs of the patient and the measuring current is passed through the entire body, such as described in U.S. Pat. No. 5,788,643. U.S. Pat. No. 8,744,564 to Ward et al. describes an electrode arrangement disposed on the patient's arms for detecting edema. U.S. Pat. No. 9,955,916 to Bonomi et al. describes apparatus and methods for estimating thoracic fluid volume of a subject using a set of trans-thoracic electrodes and one or more measurements of the circumference of the subject's chest. U.S. Patent Application Publication No. US 2005/0215918A1 describes a linear array of chest mounted electrodes for measuring thoracic bioimpedance to assess thoracic fluid level.

A drawback common to all previously known bioimpedance measurement systems is a lack of reproducibility of the measurements. Specifically, while previously known bioimpedance measurement systems may be fine-tuned to provide satisfactory results for a specific subject, such systems cannot be used on patients having materially different physical characteristics and still produce quantitatively accurate results. In addition, bioimpedance measurements suffer from poor accuracy for patients who have a combination of both air trapping and fluid accumulation in portions of their lungs. Fluid assessment based on patient weight lacks accuracy and specificity, whereas measuring fluid balance based on fluid intake and urine output cannot capture events such as acute pulmonary edema, which requires immediate clinical intervention.

Imaging methods such as CT Scan, echocardiogram, X-rays, or ultrasound present challenges like dependence on specialists, high costs, and impracticality for routine use. Further, to assess the adequacy of ventilation, there are no non-invasive tools that track the minute ventilation or breath morphology except for devices that only monitor breathing rate using sensors positioned on a patient's skin. To measure air volumes accurately, either the patient has to be intubated, which carries significant risk and is not done unless mandated by patient's criticality or made to breathe into a spirometer, which is not suitable for patients needing critical care.

For patients already under mechanical ventilation support, some of the key challenges clinicians face are (a) the right amount of fluid resuscitation necessary during intubation stage (b) monitoring air-trapping status of the lungs (c) monitoring fluid accumulation in lungs both due to cardiogenic or, infectious etiology (d) appropriate time for extubation, as extubating either too soon or too late, can lead to extubation failure and poor prognosis (e) post-extubation monitoring to catch any deterioration in fluid status or ventilation status as early as possible in order to make the correct clinical interventions. Each of these challenges require a continuous and close monitoring of the lung fluid status, air trapping status and ventilation status.

As noted above, non-invasive devices that can be used to estimate the fluid volume in the body are of either whole body fluid assessment or fluid assessment of a specific segment of the body. Whole body fluid assessment is typically based on single frequency or multi-frequency bio-impedance measured across hand to leg and from the measured bio-impedance response, empirical models are used to derive different parameters related to the fluid status such as Total Body Water (TBW), Extra-Cellular Water (ECW), Intra-Cellular Water (ICW) etc. While such technologies have been around for many years, they have found very little acceptance within the critical care settings owing to accuracy and reproducibility issues.

Various non-invasive wearable devices and technologies have been developed over the years to assess the fluid status in the thoracic region; most of them are based on single frequency bio-impedance useful to track the fluid level changes from a pre-determined baseline value. For example, U.S. Pat. No. 8,374,688 to Libbus et al. describes a patch configured to be place on the skin of a patient that includes at least four electrodes for measuring bioimpedance to determine tissue hydration. U.S. Pat. No. 11,116,448 to Trapero Martin et al. describes a patch wherein a reusable electronics module is removably coupled to a disposable adhesive patch for use in measuring upper body bioimpedance to determine fluid levels.

Bioimpedance performance is also largely determined by the quality of skin-electrode contacts. For example, U.S. Patent Application Publication No. 2021/0330212 to Ganesan et al. and U.S. Pat. No. 11,047,821 to Ano et al. describe methods to correct for non-ideal contact impedance of the skin-electrode interface. However, such techniques are suitable only for low frequency applications and may be suboptimal for broadband applications extending to several MHz.

In view of the foregoing, it would be desirable to provide systems and methods for measuring fluid levels in the thoracic region that are quantitively accurate and reproducible when used across a patient population having materially different physical characteristics.

It further would be desirable to provide systems and methods that enable quantitively accurate assessment of fluid levels in a variety of circumstances observed to confound previously known systems, e.g., for use with patients on mechanical ventilation or are being weaned off of mechanical ventilation, who experience air trapping or breathing difficulties associated with pneumonia, pleural effusion or pulmonary edema, or who are undergoing dialysis or other procedure that affects fluid levels.

SUMMARY OF THE INVENTION

The present invention is directed to a non-invasive system capable of simultaneous monitoring of fluid and ventilation status of a patient to provide quantitatively accurate and reproducible results over a wide range of patient physiologies using tissue response to a broadband electrical stimulus applied in the thoracic region. The inventive system includes a multi-electrode patch configured for placement on the skin of a patient's chest, wherein the patch includes an electronics unit configured to communicate, preferably wirelessly, with an external analysis unit. In accordance with an aspect of the invention, the external analysis unit includes algorithms trained using machine learning techniques on a large database of patient data to account for a wide range of patient physiological characteristics, such as height, weight, chest circumference, age, sex, and other physiologic characteristics. In this way, by inputting patient specific characteristics into the external analysis unit, the analysis algorithms may be personalized for a specific patient, improving accuracy and reproducibility of the results beyond the capability of previously known systems and methods.

The multi-electrode patch of the present invention preferably provides a safe electrical stimulus at a plurality of frequencies, applied simultaneously through each pair of the at least four electrodes, and measures a plurality of responses simultaneously at each of the plurality of frequencies. In this manner, a system constructed in accordance with the principles of the present invention can accommodate differences in patients' physical characteristics. The plurality of the responses may be corrected for known parasitic effects using calibration parameters determined a priori for the patch configuration. The plurality of corrected responses may be used to continuously monitor a composite response of bodily tissues and contact impedances of each of the at least four electrodes at each of the plurality of frequencies. The composite response of the bodily tissues at each of the plurality of frequencies further may be corrected with obtained values of the contact impedances at each of the plurality of frequencies. The final corrected composite response of the bodily tissues may be used to fit an equivalent distributed electrical model comprising model parameters.

The values of at least a subset of the model parameters of the equivalent distributed electrical model may be indicative of fluid status of the patient. Modulation due to respiration of at least a subset of the model parameters of the equivalent distributed electrical model may be indicative of ventilation status of the patient. The model parameters may be selected from the group comprising: an extravascular resistance and capacitance structure, an intravascular resistance and capacitance structure, a capacitive membrane separating the extravascular and intravascular regions, from which output parameters are derived. The output parameters comprising at least one of the following: a fluid score of the patient and respiration parameters of the patient. Accordingly, a system constructed in accordance with the principles of the present invention may advantageously identify and differentiate the impact of change in extravascular and intravascular fluid levels.

The electronics unit may be configured to be removably coupled to the patch and may comprise one or more transmitters, one or more receivers, a non-volatile storage, and a communications means, wherein the plurality of responses may be sensitive to changes in fluid levels and air volume at a plurality of frequencies. The received response may be fit into a distributed electrical circuit model of equivalent frequency response. Based on a circuit model parameter fit, a fluid score may be generated by referencing the extracted parameters to the corresponding parameters extracted from data collected from a healthy cohort as reference.

In an alternative embodiment, the at least four electrodes and an electronics housing may be configured as a single unit. The electronics housing may be capable of attaching to or detaching from a wearable disposable patch through the at least four electrodes. The wearable disposable patch may include at least four biocompatible gel electrodes and further include an alignment marker to assist in positioning the device on a patient's body close. The wearable patch may include snap-on electrodes that can be connected to the plurality of electrodes, which preferably are biocompatible and replaceable. The non-invasive wearable device may be portable and battery-operated, and the external analysis unit also may be portable and battery-operated.

At least one response from the external analysis unit may be output on at least one associated display screen. The at least one response may be selected from the group comprising at least one of the model parameters, at least one output parameter, and modulation of at least one of the model parameters. In one preferred embodiment, a time-varying response may be rendered on the associated display screen. Outputs may include, for example, high level outputs such as fluid score (such as intravascular fluid score and extravascular fluid score) and ventilation status (including, but not limited to, respiration rate, minute ventilation, tidal volume, rapid shallow breathing index, inspiratory and expiratory time and their ratio, expiratory time constant). The output may also include instantaneous parameter values of the equivalent electrical model obtained from fitting the response. Alternatively, the output may be combination of both types of information. The at least one display may be integrated into the external analysis unit, but more preferably may be a mobile phone, a tablet, an external patient monitor, and/or a display that forms part of an existing medical equipment. Output parameters indicative of the patient's fluid status and ventilation status may be selected from the group comprising: fluid score, breathing rate, minute ventilation index, rapid shallow breathing index, and/or expiratory time constant.

Other features of the inventive system and methods will be apparent with reference to the following description and figures.

BRIEF DESCRIPTION OF THE DRAWINGS

For a more complete understanding of this disclosure, reference is now made to the following description, taken in conjunction with the accompanying drawings, in which:

FIGS. 9A and 9B depict, respectively, placement of a patch constructed in accordance with the principles of the present invention on a patient's chest and the electric field lines created between electrodes of the patch of FIGS. 6A-6C when energized;

FIG. 10 is an illustrative time domain representation of the electrical stimulus with peak-to-peak amplitude of ±1 mA in accordance with the principles of the present invention;

DETAILED DESCRIPTION OF THE INVENTION

Embodiments of the present invention provide a simple, real-time, non-invasive, bedside solution available for fluid level assessment and assessment of air trapping and ventilation. In a departure from previously known bioimpedance measurement systems for assessing fluid levels in a patient, a system constructed in accordance with the principles of the present invention enables quantitatively accurate and reproducible measurements for a patient population having diverse physiologic characteristics and medical circumstances by employing a number of different techniques including form factor design, choice of electrical stimulus and sophisticated signal processing techniques along with machine learning algorithms to personalize system performance. In this manner, the inventive system enables simultaneous assessment of fluid and ventilation status with high sensitivity and specificity in real-time. In accordance with one aspect of the present invention, such monitoring may be accomplished using a non-invasive chest-worn electrode patch through which appropriate electrical stimuli may be passed through a patient's body and the corresponding response received across the plurality of electrodes.

Figure 1:
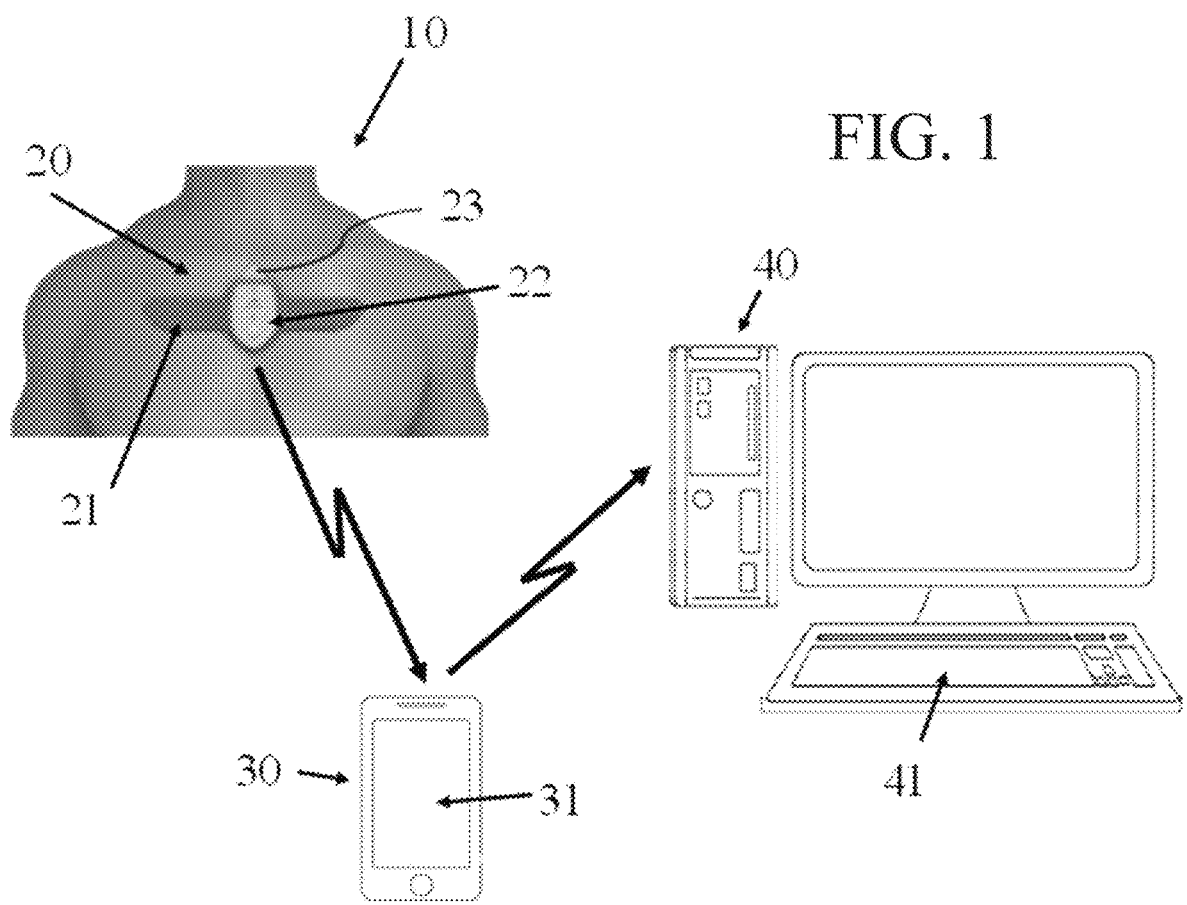
FIG. 1 depicts an exemplary embodiment of a non-invasive fluid and ventilation status monitoring system of the present invention.

Referring now to FIG. 1, an exemplary embodiment of system 10 of the present invention is described. System 10 comprises a non-invasive patch 20, configured for placement on a human chest, which includes at least four electrodes and an electronics unit for applying broadband electrical stimuli and receiving the tissue response and communicating with a hand-held external analysis unit 30, illustratively a smartphone. In one of the embodiments, the non-invasive patch is positioned around the second intercostal space to provide high sensitivity to fluid shifts and to respiratory dynamics. External analysis unit 30 may be configured to communicate with the Cloud, illustratively server 40, using either or both of WiFi communication or via cellular data exchange. In accordance with one preferred embodiment, the external analysis unit includes algorithms for receiving and analyzing the tissue response generated by patch 20 and displaying outputs on display 31 of external analysis unit 30, e.g., corresponding to instantaneous patient compartmental fluid levels as well as ventilation information.

In a preferred embodiment, the analysis algorithms may reside on external analysis unit 30 and may be downloaded from server 40 after personalization of the algorithms on server 40 using specific patient characteristics input via data input device 41 of server 40 or received from, e.g., a touchscreen component of external analysis unit 30, after an initialization step. Illustratively, server 40 may include algorithms, known in the art, for computing and displaying in real-time lung fluid volumes and respiration rates based on tissue response to broadband electrical stimuli, and to recognize and predict trends. In accordance with the present invention, however, these algorithms are optimized using machine learning, based on a large set of training data acquired from a population of patients having different physiologic characteristics and medical circumstances, thereby to enable adjustment of the algorithms according to a specific patient's characteristics and conditions.

For example, patient characteristics input to server to permit personalization of the analysis algorithms may include height, weight, sex, age, chest circumference, identification of co-morbidities or relevant medical conditions, e.g., presence of diagnosed cardiovascular disease, heart rate, A1C levels, kidney disease, edema, pneumonia, congestive heart failure or other condition that has been observed to confound previously known bioimpedance measurement systems. Additional patient-specific data may include historical medical background information including, but not limited to, co-morbidities and medications. Server 40 also may receive from external analysis unit 30 information specific to patch 20, to remove measurement variability caused by patch placement, skin contact resistance specific to a patient, or manufacturing tolerances. Server 40 uses the foregoing data to personalize the algorithms for the specific patient characteristics and medical condition, after which the personalized algorithms are downloaded to external analysis unit 30 for use in patient monitoring. In alternative embodiments, the personalized analysis algorithms may be installed and run of electronics unit 22 of patch 20 or run on server 40.

Personalized analysis algorithms that include background information of the patient's history, including, for example, co-morbidities, medications, and the historical data derived from the prior use of system 10 may be configured to trigger event-specific alerts to activate appropriate remedial measures. The personalized analysis algorithms also may be trained to automatically compute thresholds on the model parameters or the output parameters, such as described below, and to generate appropriate alerts in the event such thresholds are breached. The machine learning adjustment of the analysis algorithms may automatically define upper and lower bounds of the output for patch 20, which may be considered as a desired healthy range, by analyzing previously collected datasets from across people of different ages, gender, height, weight, chest circumference, waist circumference, etc.

Following application of patch 20 to a patient, the signal processing algorithms are personalized on server 40 using patient data input via external analysis unit 30 or input device 41 of server. The personalized analysis algorithms then are downloaded to external analysis unit 30. System 10 thereafter operates by analyzing data transmitted from patch 20, which is analyzed with the personalized algorithms, and the results displayed on display 31 of external analysis unit 30. Periodically, external analysis unit 30 may upload analysis results to a server (not shown) from which the data may be downloaded and reviewed by the patient's caretaker or clinician. External analysis unit 30 also may periodically upload data to server 40 for analysis on server 40 to confirm that the reported data is still being generated with acceptable accuracy, e.g., in case the detected fluid levels show a clinically significant change so as to require adjustment of the analysis algorithms resident on external analysis unit 30. External analysis unit 30 also may be configured to generate an alert if detected fluid levels or respiratory function passes a clinically significant threshold or is trending to do so.

Still referring to FIG. 1, in a preferred embodiment, patch 20 comprises biocompatible adhesive layer 21 having four electrodes that contact the skin to inject current and measure tissue response to broadband electrical stimuli, thereby generating a composite response, as described in further detail below. Patch 20 preferably includes an electronics unit 22 that is removably coupled to adhesive layer 21, to conduct the measurements using plurality of frequencies for the injected signal, and a communications component housed in electronics unit 22 to wirelessly exchange between electronics unit 22 and external analysis unit 30. As depicted in FIG. 1, patch 20 is configured for placement on a patient's chest and may include alignment feature 23 of adhesive layer 21 to ensure placement of patch 20 near an easily identifiable anatomical feature on the chest such as the sternal notch.

External analysis unit 30 may be a conventional smartphone using a Windows, Android or Apple IOS operating system that includes a WiFi and/or cellular communications capability, touchscreen to accept input and for display, and is battery powered. Alternatively, external analysis unit 30 may be smartphone customized for use in the system of the present invention or further may be a purpose built device. Server 40 may be a conventional server computer with associated non-volatile data storage configured to run machine learning algorithms based on large training datasets obtained from a patient population having widely varying physiologic and medical conditions, as described in further detail below.

In an alternative embodiment, external analysis unit 30 may be continuously in communication with server 40 to update the analysis algorithms used to process data received from patch 20. For example, algorithms on server 40 may continuously process data inputs received from patch 20, and such data may be employed by machine learning models for subsequent training datasets. The personalized analysis algorithms created on server 40 for transmission to external analysis unit 30 may employ techniques like time-series analysis and anomaly detection to tailor insights to each patient's unique physiological profile. The machine learning adjustments to the analysis algorithms may leverage comprehensive patient datasets to predict health issues, offer proactive alerts and recommendations. The analysis algorithms also may include predictive models to analyze combined data inputs to identify risk factors and potential health issues and to trigger event-specific alerts to activate remedial measures. In this manner, system 10 may provide context-aware alerts that enhance patient safety and care.

Figure 2A:
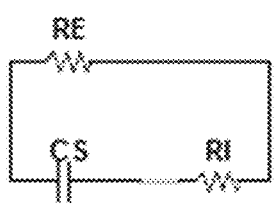
FIGS. 2A, 2B and 2C depict, respectively, an illustrative electrical model of a unit cellular structure used in known art for bio-impedance based applications such as body composition monitors; a distributed array of unit structures of FIG. 2A, which is used typically for Electrical Impedance Tomography applications; and an illustrative electrical model of an unit structure of the thoracic region in accordance with the principles of the present invention depicting a RE, which models the extravascular fluid resistance in parallel to a CE, which models the extravascular fluid equivalent capacitance, a RI which models the intravascular fluid resistance in parallel to a CI, which models the equivalent capacitance of the intravascular fluid and a CS which models the equivalent capacitance of the vasculature.
Figure 2B:
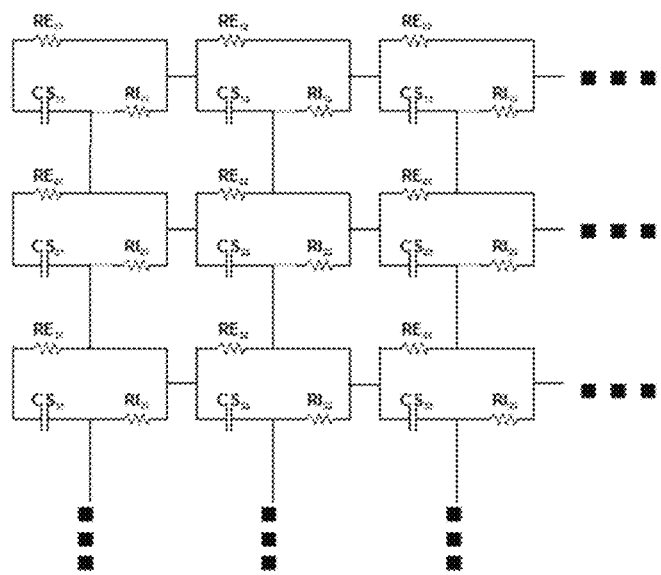

Referring now to FIG. 2A, an exemplary electrical equivalent model of a unit structure is described. The electrical equivalence of the unit structure may be modelled as an extracellular resistance RE, an intracellular resistance RI and a capacitance CS which model the cellular membrane separating the extracellular fluid from the intracellular fluid. When a measurement is done across two points on the body sufficiently separated, a distributed structure must be employed that comprises numerous heterogenous interconnected unit structures within the region of interest as shown in FIG. 2B. Previously known literature describes two methods to model a heterogenous distributed network. In one approach, e.g., using standard bio-impedance techniques, the heterogenous distributed network is empirically modelled as an equivalent lumped network comprising an equivalent RE, an equivalent RI, an equivalent CS, and a dispersion term α that accounts for the distributed nature of the individual unit characteristics. Such methods of modeling are similar to what is known in the art as the "Cole model," as described for example, in De Lorenzo et al., "Predicting body cell mass with bioimpedance by using theoretical methods: a technological review," J Appl Physiol (1985) 1997 May; 82 (5): 1542-58.

Conventional bioimpedance based technologies use the foregoing model to compute bulk electrical parameters (e.g., RE, RI, CS and a), in which the measurement field is defined as connected cylindrical structures (e.g., for hand to leg bioimpedance, the entire field is divided into three segments-a cylinder depicting the hand to the shoulder area, a second cylinder depicting the thorax and abdomen region and a third cylinder depicting the leg from the waist to the ankle). Impedance measurements along with geometrical dimensions of the individual regions are used to compute various parameters such as ECW, ICW, Fat free mass etc. Many commercially available bioimpedance devices such as for example, BCM-Body Composition Monitor from Fresenius Medical, employ this lumped-circuit modeling approach. Multiple simplifying assumptions are made in this model, contribute to a lack of specificity and accuracy. As an example, one of the assumptions made is that fluid is equally distributed across the body, which is clearly not the case for a patient having edema due to heart or renal failure Another previously known modeling approach on estimating the distributed model shown in FIG. 2B, by performing distributed measurements employing a large number of electrodes in the field of interest. This is the approach used in Electrical Impedance Tomography (EIT), wherein a number of electrodes, typically 16 or 32, are placed around the chest in a belt like arrangement to perform a series of bioimpedance measurements across a frequency range between pairs of electrodes. From those measurements, an impedance map of the entire chest is extracted using numerical methods to create an image of the chest. Since the wavelength of the excitation signal is much larger than the dimensions of the features that it is trying to image, the problem becomes ill defined and highly non-linear. Consequently, EIT images have poor spatial resolution and are also extremely sensitive to the placement location of the electrodes. Also, to be able to fit the model, create the image of the lungs, and show how well different regions of the lungs are ventilated, the numerical algorithms must account for impedance value change due to respiration. However, this requirement that impedance change with respiration results in pathological conditions such as pulmonary edema, infectious lung consolidation or pleural effusion being poorly imaged, since in these affected regions of the lung, there is high electrical conductivity which does not change significantly with respiration.

In contrast to the above mentioned known art in bio-impedance of either (a) fitting a simple lumped electrical model and a fixed physiological model for the body with further simplifying assumptions regarding fluid distribution or (b) fitting a highly distributed electrical network using a large number of measurements and numerical algorithms to derive an impedance map, the approach employed in this invention is to use a complex impedance lumped model for the extravascular and intravascular compartments in the region of interest. The measured composite tissue response is fitted to this complex impedance lumped model to derive parameters which are indicative of extravascular and intravascular fluid volume.

Figure 2C:
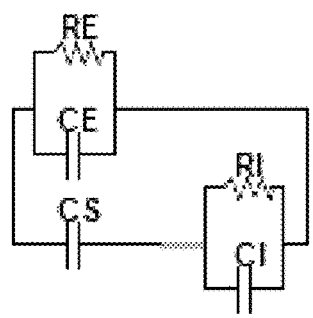

FIG. 2C shows a preferred embodiment of the present invention, wherein the overall distributed body network may be modelled as an equivalent RE in parallel to an equivalent CE, an equivalent RI in parallel to an equivalent CI and an equivalent CS, as shown in FIG. 2C. In contrast to the models of FIGS. 2A and 2B, in which RE, RI and CS represent extracellular resistance, intracellular resistance and cellular membrane capacitance, in the model of FIG. 2C, RE, RI and CS represent the extravascular fluid resistance, intravascular fluid resistance and the capacitance of the vascular wall that separates the extravascular fluid from the intravascular fluid. In this model, CE represents the equivalent capacitance of the extravascular fluid, CI represents the equivalent capacitance of the intravascular fluid. Detailed modeling of the thoracic region with complex impedances for extravascular and intravascular compartments is a significant improvement over simplified models, resulting in more accurate diagnostic outcomes. Importantly, the heterogeneous colloidal nature of body fluid can only be effectively modelled as a complex impedance as opposed to a simple resistance.

The admittance transfer function of such an electrical network shown in FIG. 2C, as a function of angular frequency ω is given by:

$$\sigma_T = \sigma_E + i\omega C_E + \frac{(\sigma_I + i\omega C_I)(i\omega C_S)}{\sigma_I + i\omega(C_I + C_S)}$$

where $\sigma_T$ is the total admittance, $\sigma_E$ is the inverse of RE and $\sigma_I$ is the inverse of RI.

To account for the distributed and heterogeneous nature of the overall electrical network comprising numerous interconnected unit blocks (as shown in FIG. 2C) and noting that different tissues shall have different electrical characteristics, a better empirical fit to the admittance transfer function is given by:

$$\sigma_T = \sigma_E + i\omega C_E + \frac{(\sigma_I + i\omega C_I)(i\omega C_S)}{\sigma_I + (i\omega(C_I + C_S))^\alpha}$$

where α is a dispersive term between 0 and 1 signifying the distributed nature of the underlying heterogenous network. The dispersive term α accounts for variations in tissue characteristics. For a perfectly homogenous network, where all tissues have identical characteristics, the value of α is unity. For a highly heterogenous network, the value of α is less than unity. For example, in patients with pulmonary edema, the network is more heterogeneous and the fitted value of α on measurements obtained for such patients is significantly lower than unity.

Incorporating neural network analysis allows for dynamic adjustments of the model parameters (e.g., RE, CE, RI, CI, CS and a) based on patient-specific data, enhancing the model's accuracy. The neural network can adjust the model parameters based on physiological inputs, enhancing the model's adaptability. This may be achieved by training the neural network on diverse datasets that include various physiological inputs such as described above and medical condition. In particular, extravascular admittance and intravascular admittance follows a specific pattern with different levels of fat versus muscle content and overall volume of the thoracic region. In a preferred embodiment, chest circumference is used as a surrogate for thoracic volume and a regression analysis of the extravascular and intravascular admittances is performed based on data obtained from healthy cohort across gender, age, chest circumference and various co-morbidities with respect to chest circumference. The regression analysis assists in determining the normal responses with upper and lower thresholds. By learning from these inputs, the neural network generates equivalent electrical parameters that ensures the model remains accurate and responsive to individual patient variations.

Measurement responses obtained across each pair of the plurality of electrodes are at first corrected for the known parasitic effects of the underlying fixed electrical network of the device. These responses are then used to estimate the skin electrode contact impedances and are also algebraically combined with variable weights to form a composite response. Further corrections to the composite response may be based on the estimates of the contact impedances.

The final corrected composite response of the bodily tissues may be fitted to the equivalent distributed electrical circuit model using a non-linear fitter, e.g., a Levenberg Marquardt algorithm. An obtained value of the output parameters of the equivalent distributed electrical circuit may be provided as an input to an artificial intelligence algorithm which also takes in other patient physiologic data to provide a fluid score. Other input patient data may include, but are not limited to, height, weight, sex, age, chest circumference, and an identification of relevant medical conditions and co-morbidities, e.g., presence of diagnosed cardiovascular disease, heart rate, A1C levels, kidney disease, edema, pneumonia, congestive heart failure or other condition that has been observed to confound previously known bioimpedance measurement systems. Machine learning modification of the analysis algorithms thus enables real-time analysis and visualization, adapting outputs to patient-specific trends and providing personalized insights.

Figure 3:
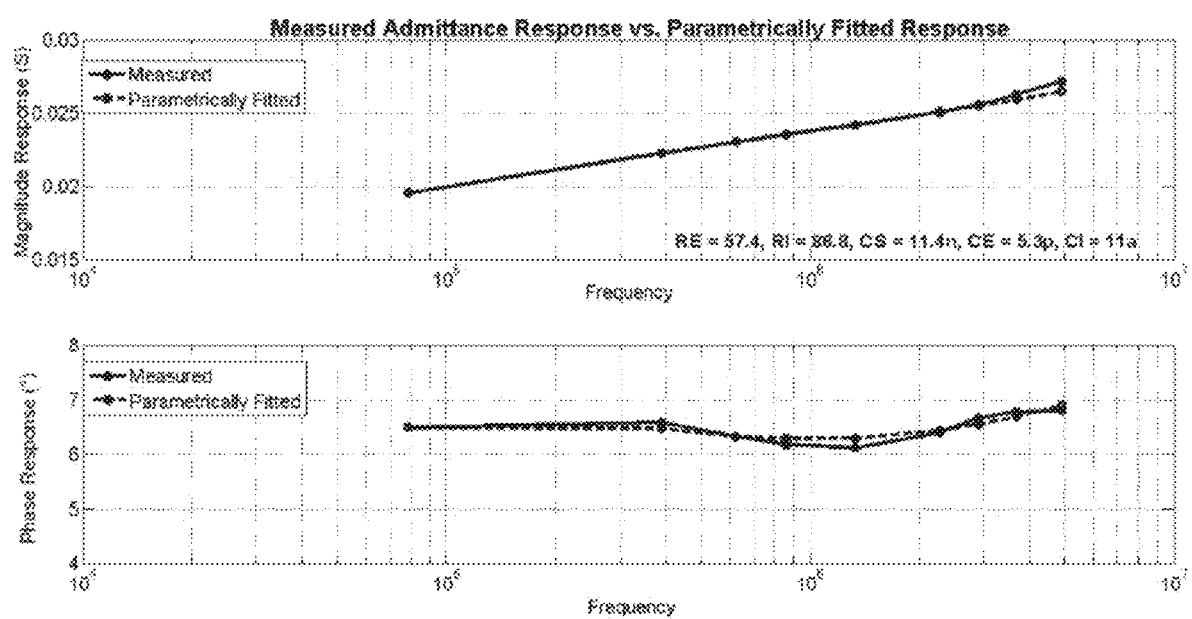
FIG. 3 depicts the magnitude and phase response of admittance and a fitted response based on best fit estimates of the equivalent parameters for the electrical model of FIG. 2 in accordance with the principles of the present invention.
Figure 4:
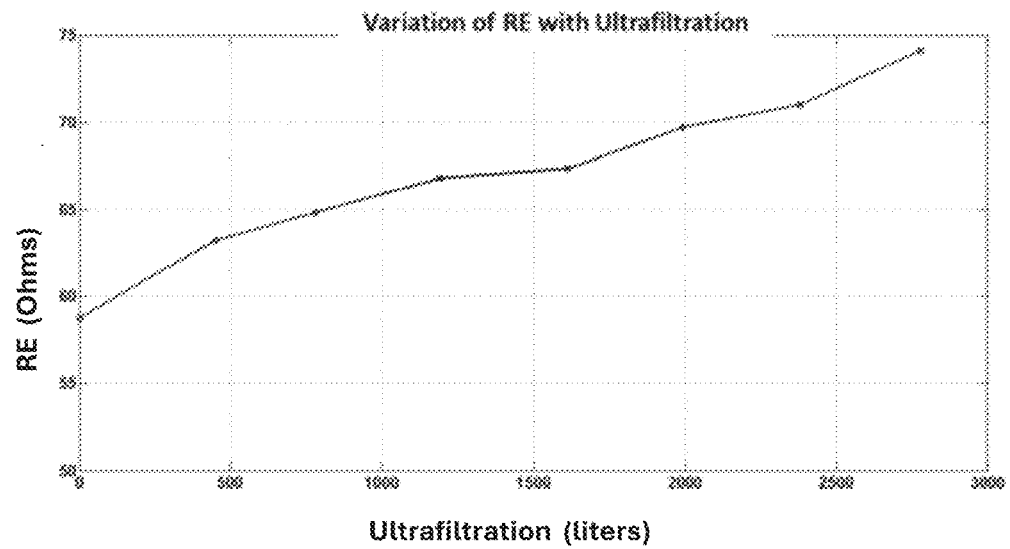
FIG. 4 shows the change of RE in the model of FIG. 3 during a dialysis session with increasing ultrafiltration volume in liters.

Referring to FIG. 3, the magnitude and phase response of admittance and a fitted response based on best fit estimates of the equivalent parameters is depicted. The parameter RE (extravascular resistance), signifies the extent of extravascular fluid. A low value of RE may signify an excess of extravascular fluid. With removal of fluid, the value of RE is expected to increase. For example, FIG. 4 shows the change of RE during a dialysis session with increasing ultrafiltration volume.

In accordance with one aspect of the invention, machine learning may be used to modify the algorithms used to process the electrical response data generated by patch 20 to enable the differentiation of accumulated fluid or air trapping from normal conditions. For example, for patients undergoing maintenance hemodialysis, a desired healthy range of fluid scores might be adjusted by analyzing historical data of the fluid score for that patient, along with additional inputs such as blood pressure, and patient reported symptoms, such as cramps, nausea, etc. The clinical treatment for the patient then may be adjusted so that the output of system 10 stays within specified bounds. Alerts may be generated if measured outputs exceed these bounds, necessitating clinical intervention.

Machine learning techniques also may be applied on extracted parameters, such as computed values of RE, RI, CS, CE, CI in the model of FIG. 2B, based upon the input physiologic characteristics as well as measurements taken from healthy subjects and from patients with diagnosed fluid overload, acute dehydration, or air trapping. The personalized analysis algorithms may identify normal ranges for the patients based on datasets collected from subjects having a diverse set of physiologic characteristics and medical conditions. Deviations of the characteristics for a particular patient from the corresponding normal ranges may signify a fluid overload, a condition of dehydration, or air-trapping resulting in generation of suitable alerts for clinical intervention. The estimation of thoracic fluid using RE provided by the machine learning adjusted algorithms of the present invention provides a significant advancement over previously known systems for tracking body fluid.

Figure 5:
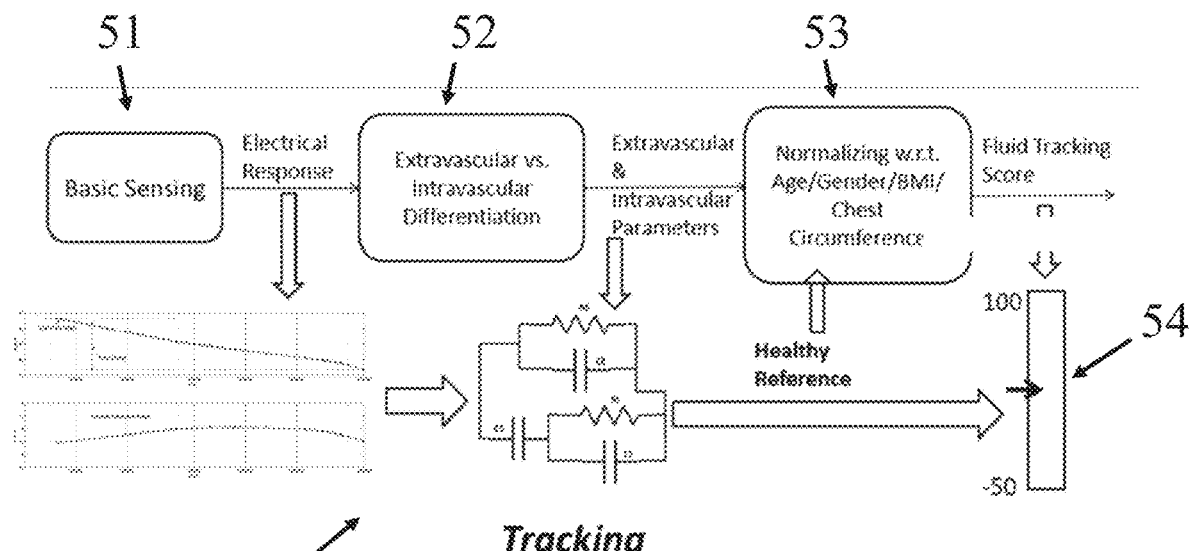
FIG. 5 is an exemplary method to generate a fluid tracking score by first fitting an equivalent electrical model to the electrical response and using machine learning to normalize and adjust outputs generated by the system in accordance with the principles of the present invention.

FIG. 5 illustrates at a high-level operational flow of the system 10. Method 50 begins at 51 with sensing patient electrical response to extract generalized extravascular and intravascular parameters through resistor-capacitor (RC) network modeling, at 52. This model is then normalized with respect to a large database of patient data including, but not limited to, physiologic data, medical condition, and comorbidities, etc. to generate an analysis algorithms that produce quantitatively accurate results over a diverse patient population, at 53. These normalized algorithms then may be personalized for use with a specific patient by inputting patient-specific information, such that the resulting personalized analysis algorithms when transmitted to external analysis unit 30 generate a real-time fluid tracking score and/or respiratory data, based on the tissue response received from patch 20, at 54.

Figure 6:
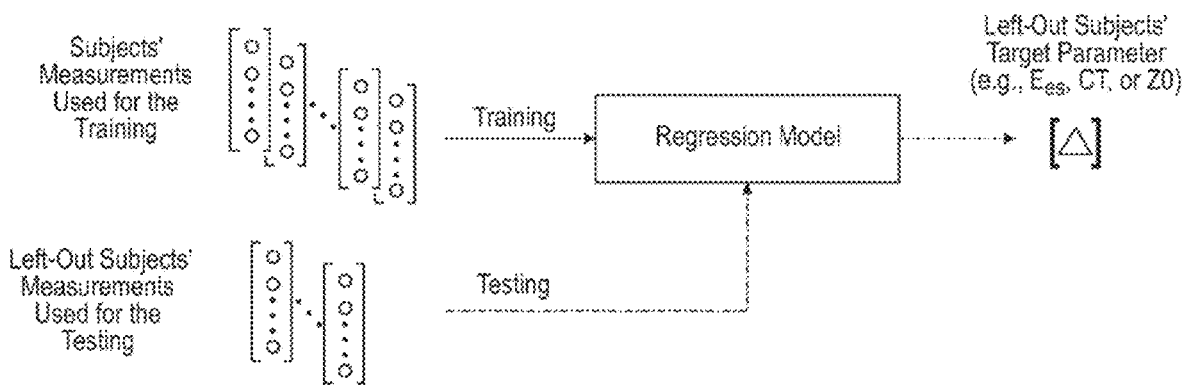
FIG. 6 depicts an exemplary process for training the machine learning component of the measurement system of the present invention to normalize the broadband tissue response over a patient population having a wide range of physiologic characteristics and medical circumstances.

FIG. 6 illustrates a method of training the machine learning algorithms used with system 10 to enhance system accuracy and reproducibility. In accordance with one aspect of the invention, well-characterized patient data is collected for a large patient population, for which device measurements are collected along with fluid level and respiratory data obtained by one or more high-accuracy conventional methods. As is known for training machine learning systems, the dataset is segregated into a training set and a verification set, preferably with each dataset encompassing a wide range of patient physiologic characteristics, medical conditions, and co-morbidities. The training dataset is used with a regression model to optimize performance of the electrical equivalent model. The optimized model then is tested with the verification dataset to confirm that, when personalized with patient-specific data associated with the verification dataset, the optimized algorithms provide clinically accurate results. Thereafter, when a patient is to be monitored using system 10, the patient data may be input to server 40 to generate analysis algorithms for use in external analysis unit 30 that provide clinically acceptable results for that specific patient.

Figure 7:
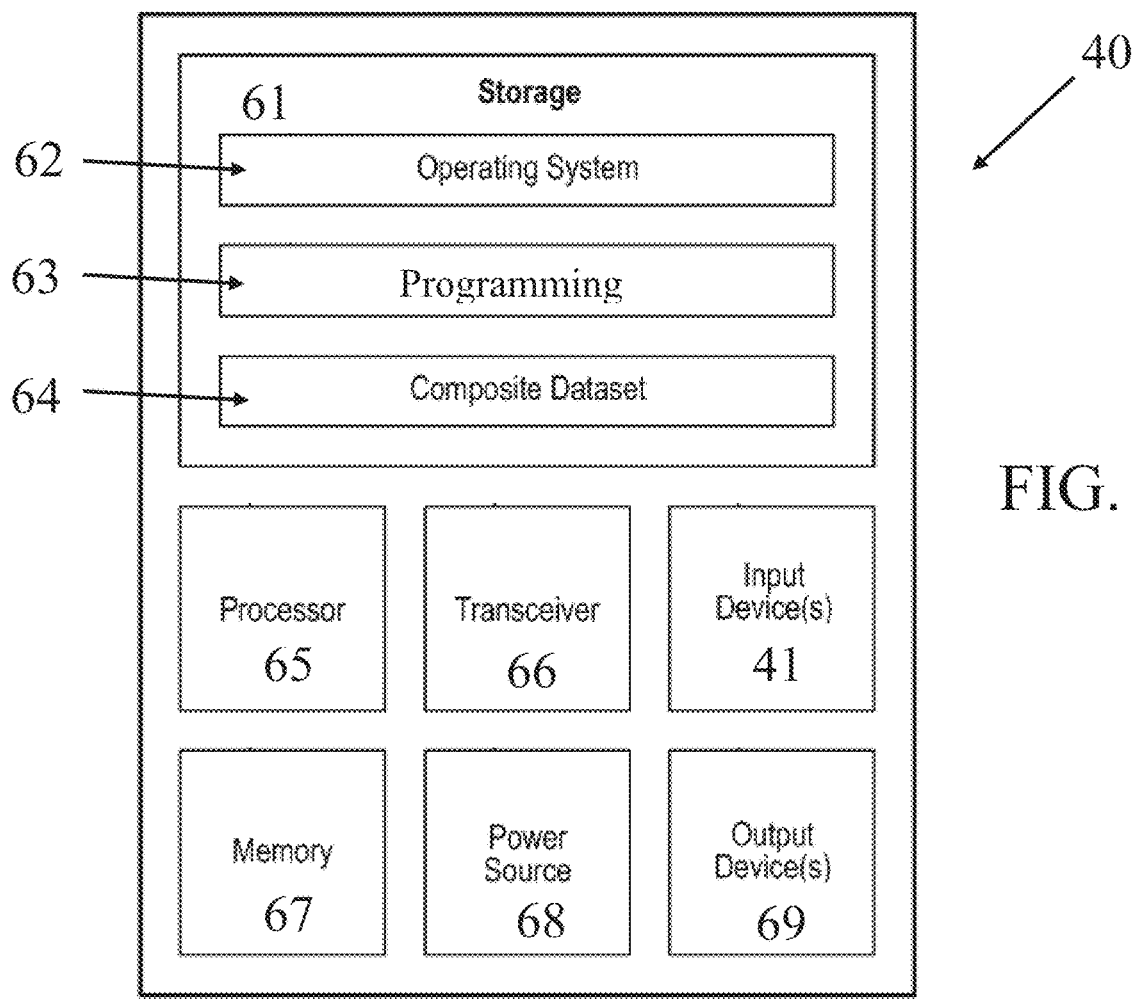
FIG. 7 is a schematic block diagram of a server, suitable for location in the Cloud, programmed in accordance with principles of the present invention.

Turning to FIG. 7, an illustrative block diagram for server 40 suitable for use in a system constructed in accordance with the principles of the present invention is described. As described above, server 40 may be employed to create and optimize the electrical equivalent model employed in the analysis algorithms, normalized with respect to a large-scale patient dataset. Server 40 also may be used to personalize the analysis algorithms installed on external analysis unit 30 in accordance with the patient-specific data and for a specific patch 20. The analysis algorithms employed by external analysis unit 30 may be periodically updated and/or recalibrated by communicating with server 40, for example, when the patient fluid levels exceed specified thresholds or the patch is replaced.

In an alternative embodiment of system 10, external analysis unit 30 may serve only to relay data between patch 20 and server 40. In this embodiment, server 40 is supplied with and retains patient-specific data associated with the external analysis unit and employs a continuously updated electrical model to determine fluid levels and respiration data. In this case, personalized analysis algorithms are not downloaded from server 40 to external analysis unit 30. Instead, all of the computations responsive to the sensed response from patch 20 sent via external analysis unit 30 are performed on the server 40, which returns to external analysis unit 30 only data for display along with any alerts requiring remedial action. While this embodiment advantageously enables the measurement data to be analyzed with a continually improved algorithm as the training and verification datasets expand, it may entail some time lag as the data is sent to and results received back from server 40.

Still referring to FIG. 7, server 40 may comprise multiprocessor computer having associated non-volatile storage 61 that contains operating system 62, storage 63 for the programming implementing the electrical equivalent module, and storage 64 for the training and verification datasets. Server 40 further includes one or more processors 65, transceiver 66 for communicating with a plurality of external analysis units 30, e.g., Ethernet ports, input device 41, which may be a keyboard and/or mouse, random access memory 67, power supply 68 and output device 69, e.g., display screen. Server 40 may comprise a commercially available multiprocessor computer or server that executes the analysis algorithms to determine equivalent electrical parameters and machine learning optimization and personalization programming.

Figures 8A, 8B, 8C:
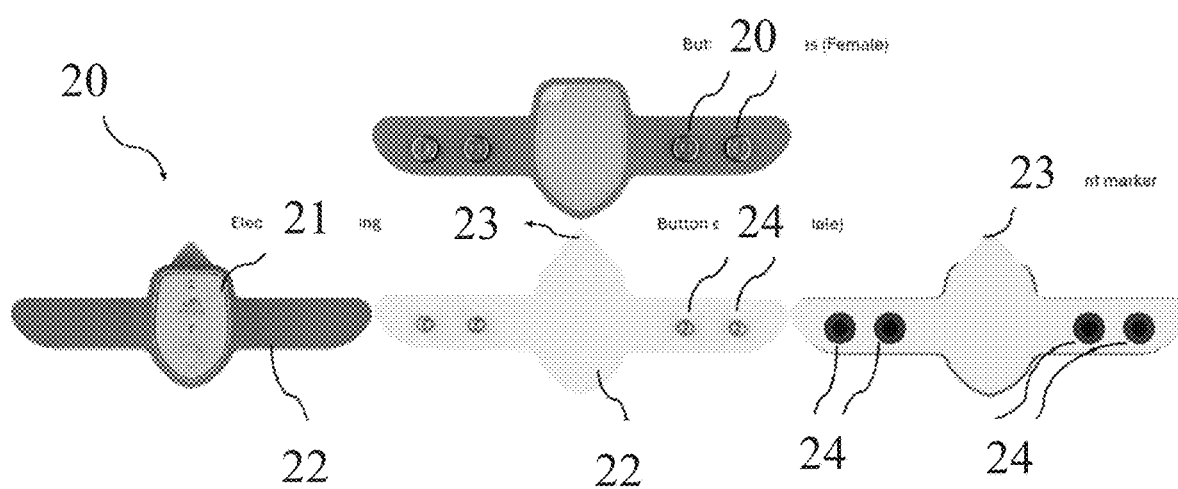
FIGS. 8A-8C depict an exemplary non-invasive patch for use with a system constructed in accordance with the principles of the present invention.

Referring now to FIGS. 8A-8C, non-invasive patch 20 for monitoring fluid and ventilation status of system 10 is described. Patch 20 is configured to be worn on the patient's chest and monitor the fluid levels and extent of air trapping in the lungs. As discussed above, the broadband tissue response generated by electronics unit 22 of patch 20 may be displayed in a graphical user interface (GUI) on external analysis unit 30 or other unit. Measured fluid levels or respiratory information may be provided to other medical operations equipment, such as a dialyzer machine or a mechanical ventilator, the operation of which may be adjusted responsive to the measurements of system 10.

Patch 20 includes a plurality of electrodes 24 that inject an electrical signal through the body to measure changes in fluid levels and air volume at various frequencies, particularly for assessing lung fluid levels and/or air trapping in lungs. The response may be modulated during respiratory motion, which system 10 may graphically display in addition to extracted parameters including, but not limited to, breathing rate, minute ventilation index, Rapid Shallow Breathing Index (RSBI), and/or expiratory time constant. In one embodiment, patch 20 may be calibrated using the forced air volume from a mechanical ventilator to extract calibration coefficients, which then may be used to track patient's respiratory dynamics and report minute ventilation, even after the patient is extubated from mechanical ventilation support.

In a preferred embodiment, patch 20 includes at least a set of two pairs of electrodes 24, as depicted in FIG. 8C, wearable adhesive layer 21, and electronics unit 22, which is detachable from the wearable adhesive layer using a connector or molded feature disposed on the wearable adhesive layer 22, as shown in FIGS. 8A-8B. The electronics unit preferably includes one or more transmitters, one or more receivers, a non-volatile storage such as flash memory, and a communication means such as Bluetooth or WIFI chip. The electrodes and the adhesive layer may be configured to form a single unit. Alternatively, the adhesive layer and the electronics unit may be configured as separate units that are connected by a snap-on magnetic connector, or molded feature. As a further alternative, patch 20, including electronics unit 31 may be completely disposable. Feature 23 on adhesive layer 22 assists in positioning patch 20 on the skin of a patient's chest.

In a preferred embodiment, upon activation, patch 20 and external analysis unit 30 may perform internal checks to ensure satisfactory status of the electronics, sufficient charge on the component batteries, and sufficient free memory to allow computations. A low battery state or insufficient levels of memory may be flagged on external analysis unit 30 as warning conditions which may prevent system activation. The user or clinician then may recharge the battery or free up memory on the respective devices as appropriate. In certain conditions, patch 20 may fail its activation check due to malfunctioning electronics, in which case an error condition is triggered requiring the user or clinician to replace patch 20.

In particular, electronics unit 31 may include a rechargeable battery especially storage receptacle that facilitates easy charging and recharging. In some embodiments, the charging of the battery may be performed using a charging cable (e.g., USB-Type C or a magnetic pogo pin connector) or via wireless inductive charging. The storage receptable also may be designed to include a known pre-calibrated electrical load (e.g., a resistive network) that can be used to verify the functionality of the electronics unit 31 before use on a patient. For example, the electrical load network may be fabricated on a platform (e.g., a printed circuit board) with electrodes such that the patch can be docked and an electrical connection established between the patch electrodes and the load network.

As discussed above, patch 20 preferably is worn on the chest and includes a disposable adhesive layer having multiple electrodes and an interface for accepting reusable electronics unit 31. Alignment marker 23 may be provided to ensure consistent placement (e.g., as shown in FIG. 1), to reduce errors due to mispositioning. Moreover, electronics unit 31 preferably combines near-field and far-field electrical spectroscopy to provide high sensitivity to changes in lung fluid status. Unlike traditional bioimpedance spectroscopy, the method of operation of the system of the present invention employs a broadband electrical stimulus across multiple electrode pairs, thus enhancing the accuracy and reliability of the measurements.

In accordance with the principles of the present invention, system 10 may be configured to monitor fluid and ventilation status of a patient by passing a small electrical stimulus through each pair of electrodes and measuring the response across respective pairs of electrodes. Design choices for patch 20 include, but are not limited to, choice of location of placement of the electrodes on the chest, the spacing between the electrodes, the choice of the electrical stimulus, the design of the receiving circuitry, and design of algorithms (both physiological as well as data-driven), which may vary in different embodiments. Such design choices may be made so as to maximize the sensitivity of the system to fluid shifts and change in breathing dynamics, and to minimize sensitivity to other factors including, but not limited to, quality of the skin contact or amount fat content.

FIG. 9A illustrates placement of patch 20 on a patient's chest. FIG. 9B illustrates the electric field lines that arise when there are no fixed current injection and sense electrodes in accordance with an aspect of the present invention. In a preferred embodiment, current injection and sensing of the response is accomplished across each pair of electrodes; FIG. 9B illustrates how these electric field lines 70 spread across different tissue types in the body. As shown in FIG. 9B, patch 20 includes four electrodes that are split into pairs to measure the response. Electrodes in the conventional bioimpedance systems generally use have large inter-pair and intra-pair spacing. In accordance with one aspect of the invention, however, the four electrodes of patch 20 are split into two pairs with small intra-pair spacing while maintaining a large inter-pair spacing. In this manner, the electrodes are well-situated to capture both near-field components and far-field components of the electrical field lines. This feature provides much better sensitivity to changes in fluid levels, compared to conventional bioimpedance where typically 5 cm or greater spacing is maintained between current injection and sense electrodes. In a preferred embodiment, the sensitivity may be enhanced up to 5-10 times more than the conventional bioimpedance methods.

Further in accordance with the present invention, a plurality of frequencies are employed with patch 20, and a sensor calibration scheme is implemented to correct unwanted effect of electrical parasitic network, thereby ensuring accurate measurements across a wide range of frequencies. In a preferred embodiment, patch 20 employs a unique electrical stimulus design that simultaneously stimulates tissues with multiple frequencies to collect responses across all of the frequencies simultaneously. This rapid response time, achieved within 6 milliseconds, is expected to ensure reliable readings even in the presence of dynamic motion, e.g., caused by heartbeats or respiration. Furthermore, the signal processing technique employed by system 10 is expected to enable continuous real time measurement of skin-electrode contact impedance at the same rate as the tissue response, thus reducing errors due to poor skin contact and maintaining the quality of the broadband measurements.

It is known that an increased skin-electrode contact impedance at any of the plurality of the electrodes may result in a loss of accuracy. Significant contact impedance mismatches between the plurality of electrodes also may result in loss of accuracy of the responses. To address these concerns, system 10 may be trained with precisely known load networks and different combinations of contact impedances during manufacture. A machine learning model also may be employed to account for accuracy loss arising from different combinations and values of the load network and each of the plurality of contact impedances at the electrodes. As described below, the calibration coefficients used in the analysis algorithms also may be adjusted based on specific patch characteristics and by continuously monitoring the plurality of contact impedances.

As indicated above, current injection via the electrode of patch 20 is performed at a plurality of frequencies. It is known that the response to a multi-frequency electrical stimulus is a function of tissue characteristics—e.g., fat, muscle, bones and blood and the plurality of skin electrode contact impedances. It is known that previously known bioimpedance based solutions suffer from lack of specificity, as baseline impedance is a strong function of presence of fat in analyzed tissue. In accordance with one aspect of the invention, a series of measurements are conducted across pairs of the patch electrodes (e.g., two at a time), to largely cancel the effect of the skin layer and the fat underneath the skin. A weighted combination of the responses for the electrode pairs then is used to get a final broadband composite response, which relegates the impact of fat to a second order effect. This broadband response is input into the complex distributed RRC network model of FIG. 2B to obtain the extravascular impedance, intravascular impedance, an effective membrane capacitance separating the intravascular and extravascular space and the dispersive parameter.

More specifically, using the continuous measurements across different combinations of plurality of electrodes, the contact impedances at each of the plurality of the electrodes may be estimated continuously, along with the composite tissue response of the region of interest. The overall composite tissue response depends on the relative distribution of the different tissues in the thoracic region. Each of these tissues also exhibits different phase responses across frequencies and a combined analysis of the overall magnitude and phase response of the signal yields important insights on the effects of the underlying tissues and the impact of extravascular fluid. Muscles, well perfused with blood offer higher conductivity to the electrical stimulus whereas fat or bone is less conductive of electrical stimulus. Extravascular fluid as in pulmonary edema or, pleural effusion or, pericardial effusion leads to increased conductivity of the electrical stimulus.

In a preferred embodiment, the electrical stimulus may comprise a plurality of frequencies combined with a predetermined amplitude and phase for each of the plurality of frequencies. The maximum admissible root mean squared (rms) current to the body is limited to prescribed safety limits (e.g., as defined in IEC 60601-2 standard). The peak electrical stimulus should be determined by the dynamic range available on the electrical hardware. In general, it is desirable that the electrical stimulus maintains the minimum possible peak to rms value ratio, thereby minimizing the dynamic range of the electrical hardware while maintaining the prescribed safe rms level of the electrical stimulus.

The electrical stimulus preferably is designed with a pre-defined coherence length. In particular, sinusoidal signals of wavelengths, which are integer factors of the coherence length, may be added together, each with a specific amplitude and phase angle. The choice of amplitude is selected to counter the frequency dependent attenuation of the signal in the intervening parasitic network. The phase angle for each of the plurality of frequencies may be determined to minimize the peak to rms value ratio of the signal.

In an exemplary embodiment, a signal of coherence length of about 12.8 μs is constructed by adding nine (9) sinusoidal signals whose minimum frequency is about 78.125 KHz, with other frequencies being integer multiples of the minimum frequency. The maximum frequency may be about 4.92 MHz, which is about 63 times the minimum frequency. The intermediate frequencies are chosen to cover the entire range from about 78.125 KHz to about 4.92 MHz with reasonably uniform spacing, while the amplitudes of all of the sinusoids are kept identical. FIG. 10 is a time domain representation of the electrical stimulus with peak-to-peak amplitude of ±1 mA. The phase angles of each of the sinusoid have been assigned to maintain the minimum peak to rms ratio (1.845).

Alternate embodiments with a composite response constructed using individual sinusoids having unequal amplitudes may also be possible. Signals may also be constructed such that the signal frequency may be chirped from a certain low value to a certain high value within a specified duration and the response within the specified frequency interval may be monitored. All these methods of producing simultaneous multi-frequency stimulus may be employed in embodiments of the present invention.

In case of events such as fluid build-up, increased air-trapping, or a drop in minute ventilation, system 10 may be configured to generate an alert. The alert may be generated by external analysis unit 30 as a digital display or alarm sound, and/or communicated to server 40 for forwarding to the patient's clinician or care giver, e.g., by retransmission from server 40 to a monitoring mobile phone, tablet, or personal computer.

As stated above, the response to electrical stimulus sensed by patch 20 may be corrupted by unwanted electrical parasitic network that is an integral part of patch 20. To address this potential signal corruption, for each of the plurality of measurement configurations involving a pair of electrodes on patch 20, a calibration may be performed with a plurality of precisely known electrical loads to estimate the parasitic network of that specific configuration of patch 20. Such calibration may be performed for each patch 20 during placement on a patient and initialization and periodically updated by recalibration during operation of system 10. For example, the precisely known electrical loads may include a set of accurately-valued electrical resistors, e.g., 0.1% tolerance resistors, ranging from a short circuit (0Ω) to 1 KΩ in steps of every 100Ω. The resistors may be sequentially connected across the respective pair of electrodes involved for a specific configuration and stored in memory on board the patch, external analysis unit 30 or server 40. The measurement values may be modelled as a smooth function of the actual value of the electrical load. Neural network based modelling also may be used to obtain the calibration parameters from the training set of measurements obtained from the precisely known electrical loads.

The parameters of the estimated function will result in a set of calibration coefficients that are fixed for non-invasive patch 20 and may be stored in a non-volatile storage. The calibration coefficients may be invoked during field measurements and may be used to de-embed the raw responses received by patch 20 to provide corrected responses free from the ill-effects of the electrical parasitic network. Alternatively, at least some of the calibration coefficients for a patch 20 may be determined at time of manufacture and stored in an EPROM or EEPROM included in electronics unit 22.

Figure 11:
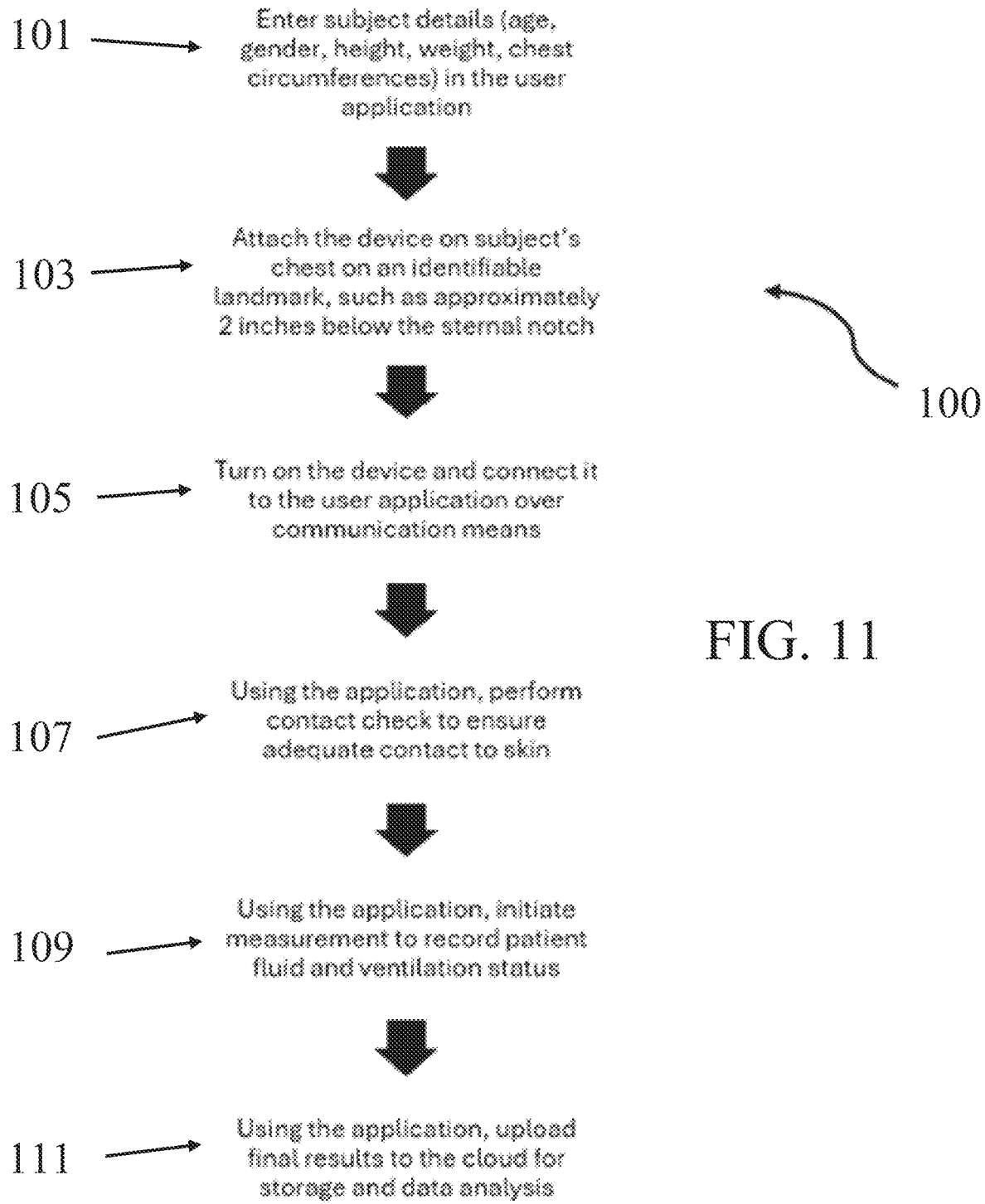
FIG. 11 illustrates a flowchart depicting a method for measurement workflow using the non-invasive device of FIG. 6 in accordance with the principles of the present invention.

Referring now to FIG. 11, flowchart 100 depicting measurement workflow for use of system 10 is described. At step 101, physiologic data for the patient including, but not limited to, age, gender, height, weight, chest circumference, and/or waist circumference may be entered via the touchscreen of external analysis unit 30 or input device 41. This data may be transmitted to server 40 for use in personalizing the analysis algorithms downloaded to external analysis unit 30 or employed directly by server 40 for a cloud-based embodiment. Alternatively, or in addition, the data may be input using a separate mobile application, tablet, and/or personal computer accessible to the clinician or care giver.

At step 103 of method 100, patch 20 is attached to the chest of the subject at a predefined position. In a preferred embodiment, patch 20 may be applied to the skin of a subject's chest at an identifiable landmark, e.g., about 2 inches below a sternal notch of the patient, as shown in FIG. 1. At step 105, patch 20 is activated, e.g., using a switch or removing an insulating tab disposed between a rechargeable battery and contacts within electronics unit 22. Once activated, electronics unit 22 of patch 20 will establish communication with external analysis unit 30 (the user application installed thereon) via a Bluetooth or 802.11x WiFi connection. External analysis unit 30 also will upload the patient data to server 40, using a WiFi or cellular telephone connection to server 40, and may in addition upload the calibration coefficients computed by, or stored within patch 20 that are specific to that patch and patient environment. In response, in a preferred embodiment, server 40 which will download analysis algorithms to external analysis unit 30 which are personalized by server 40 using machine learning and the uploaded patient and patch specific data.

At step 107 of method 100, to complete the initialization step for patch 20, external analysis unit 30 may perform a check to confirm adequate contact is established between the electrodes on patch 20 and the patient's skin. Next, at step 109, the user application on external analysis unit 30 may receive broadband tissue response measurement data received from patch 20 and employ that data and the patient-personalized algorithms downloaded from server 40 to compute and record patient fluid status, air trapping status, and ventilation status. At step 111, once the patient's fluid and ventilation status are successfully initialized, using the user application on external analysis unit 30, additional monitoring data may be analyzed on external analysis unit 30, and/or recorded and uploaded to a cloud-based storage location for further processing, storage, and data analysis.

Thoracic fluid levels in a person also may depend on the posture of the person when a measurement is taken. In one embodiment, patch 20 may include a posture sensing device (e.g., a 3-axis accelerometer) to determine the posture of the person while the measurement is being taken. Depending on the patient's condition and the preferences of the clinician, a specific posture may be preferred for taking measurements. For such situations, a posture sensing device may be activated to sense the patient's posture from a pre-determined time preceding and then throughout the measurement period. If the posture of the patient is not found to be suitable, patch 20 may generate an alert and defer the measurement till the time the posture of the patient has been corrected. In an alternative embodiment, a posture sensing sensor, such as a 3-axis accelerometer, might be used to detect motion artifacts, such as a cough or other movement, and this information may be used to assess whether the tissue response measurements are reliable.

In an embodiment, the machine learning integrates posture data to adjust the tissue responses, ensuring that the measurements remain accurate despite changes in patient position or movement. This is achieved by training the machine learning algorithms on datasets that include various posture scenarios and corresponding effects on tissue response. In this way, the personalized analysis algorithms reflect patterns in posture data that have been correlated with changes in tissue response. By continuously analyzing real-time posture inputs received from patch 20, the analysis algorithms running on external analysis unit 30 and/or server 40 may dynamically adjust the tissue response to compensate for any posture-induced variations. This ensures that the measurements are accurate and reliable, regardless of patient movement or position changes.

Figure 12A:
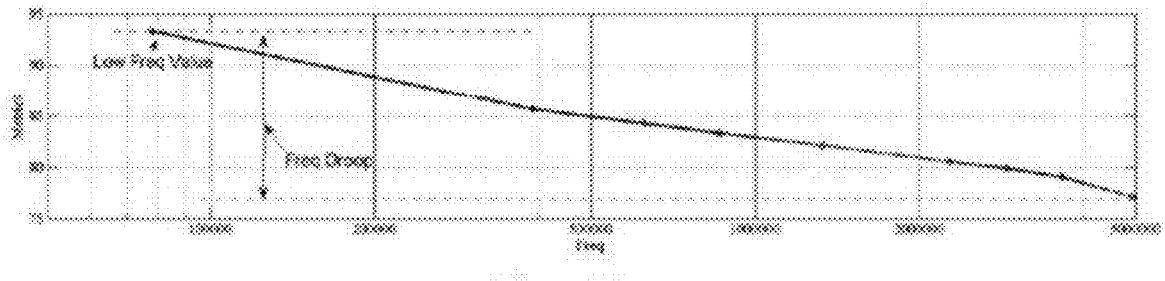
FIGS. 12A-12B illustrate graphical representations of the non-invasive device response across frequency according to an embodiment of the present invention.
Figure 12B:
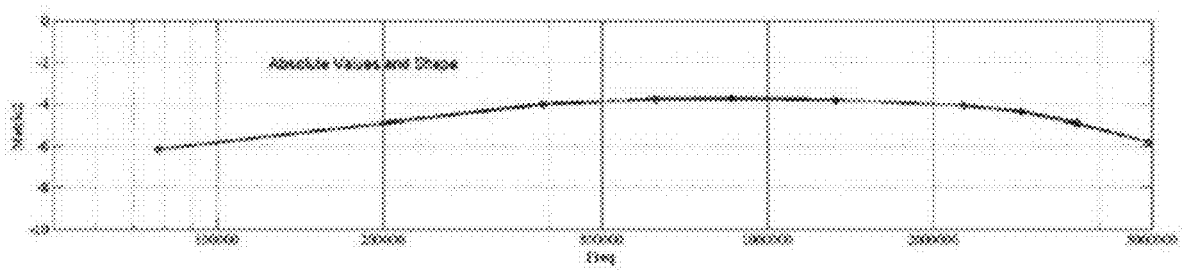

Referring now to FIGS. 12A-12B, a graphical representation of system 10 response as a function of injection current frequency is described. In particular, FIGS. 12A-12B depict the tissue response generated by system 10 in response to applied broadband electrical stimulus as a function of frequency in hertz (Hz). Two metrics (Metric 1—FIG. 12A) and Metric 2 (FIG. 12B)) are analyzed across frequency, such that specific features may be extracted from these plots to provide sensitive and specific information on the fluid status and air trapping status of the lungs. For example, these specific features could be the low frequency value of Metric 1, frequency droop in the value of Metric 1, and change of Metric 2 across frequency. Metric 1 may correspond to the magnitude response of the electric potential, while Metric 2 corresponds to the phase response of the electric potential obtained from the tissues by the receiving circuitry for a given broadband electrical stimulus. The output of the analysis may provide plots, for example, depicting fluid status and air trapping status.

Figure 13:
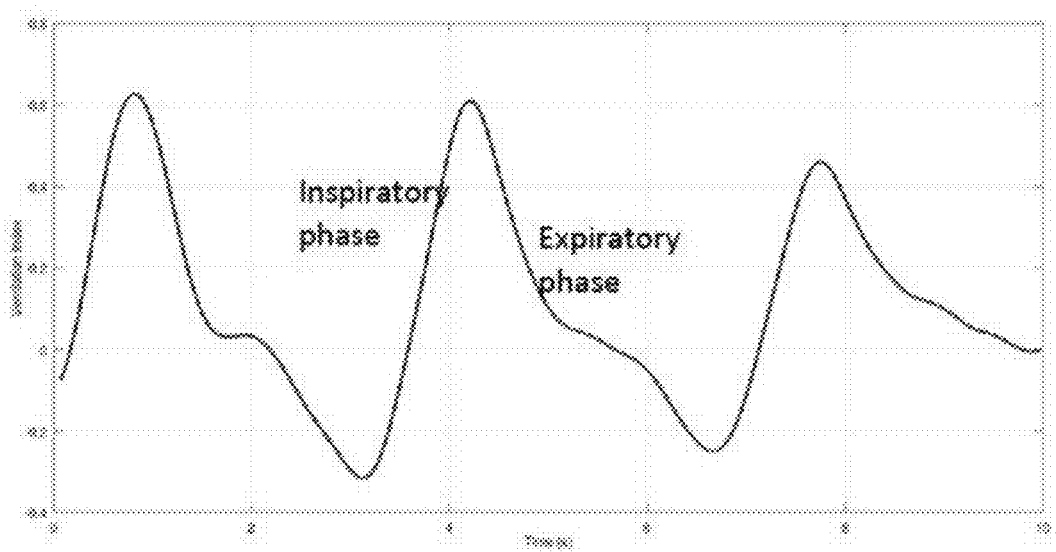
FIG. 13 is a graphical representation of the non-invasive device output for the ventilatory dynamics of a patient according to one aspect of the present invention.

FIG. 13 is a graphical depiction of output of system 10 with respect to ventilatory dynamics of a patient according to an embodiment of the present invention. FIG. 13 depicts a ventilation index, i.e., the ventilation status of the patient as a function of the time as captured by system 10, e.g., when used in accordance with method 100 of FIG. 11. Monitoring respiratory parameters using patch 20 and system 10 may be accomplished by recording the time variation of the response to electrical stimuli at a specified frequency or, at a plurality of frequencies. It is hypothesized that the response is modulated by the volume of air transacted in a breath cycle. Accordingly, tracking this modulation over time is expected to provide insights on respiration rate, respiration morphology, and minute ventilation. Although minute ventilation may not be obtainable directly in volume units; it may be calibrated from a known reference, as described herein. Once calibrated, system 10 will continue to provide an estimate of minute ventilation along with respiration rate, and respiration morphology throughout its measurement duration as discussed below.

The response obtained from system 10 at a plurality of frequencies is also modulated with the air-flow due to respiration. Respiration causes a modulation of blood flow in the capillaries of the lung wall. During the start of inhalation, the incoming air fills the air spaces in the lungs (the alveoli), causing them to expand. This expansion in turn causes the mesh of the highly compliant thin-walled capillary network that surround the alveoli to be stretched and thinned, resulting in increased resistance to blood flow. This phenomenon is expected to manifest as an increase in electrical resistance, which may be modeled by the extravascular impedance (RE) in the model of FIG. 2. During exhalation, as the air exits and the alveoli collapse, the capillary network surrounding the alveoli relaxes and offers reduced resistance to blood flow. This in turn manifests as a decrease in electrical resistance, causing a reduction in extravascular impedance (RE). Accordingly, modulation of RE during respiration corresponds to the modulation of resistance to blood flow in the capillaries during respiration, which directly results from alveolar volume changes due to respiration. Thus, RE modulation during respiration is expected to be a good surrogate for measuring tidal volume.

Figure 14:
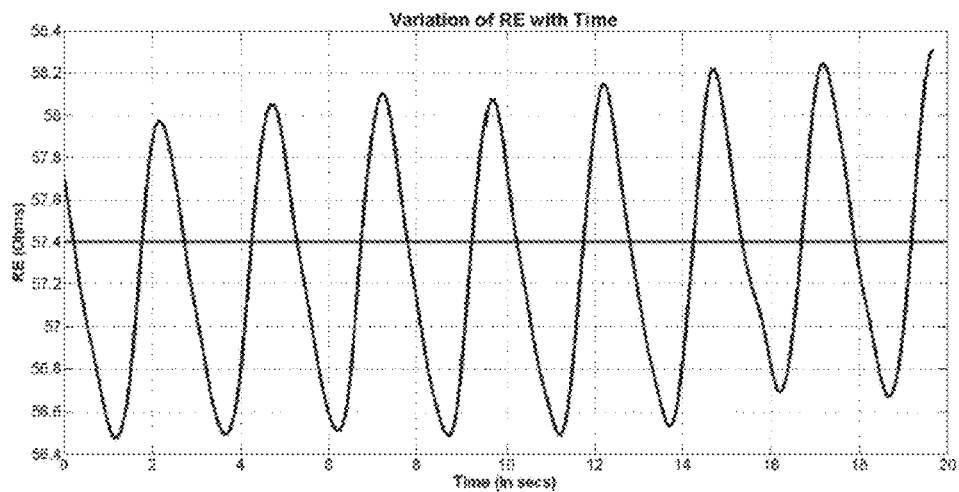
FIG. 14 represents the time variation of RE in the model of FIG. 3 estimated from a thoracic measurement.

Referring to FIG. 14, the baseline thoracic fluid status may be monitored by tracking the average value of RE, averaged over several respiration cycles. The variation of RE over a respiratory cycle captures the respiratory dynamics. FIG. 14 depicts the time variation of RE estimated from a thoracic measurement. Tracking of respiration rate, minute ventilation and a rapid shallow breath index are all possible using the ventilation waveform obtained from the filtered and normalized value of RE.

Additional insights can be obtained by tracking other parameters such as RI and CE as well, how their value averaged over several respiration cycles behave, along with how they vary within a respiration cycle. This is expected to provide important insights, especially for pathological conditions of fluid buildup such as interstitial edema, pleural effusion, or pulmonary edema. In such cases, the average value of these parameters over multiple respiration cycles will be significantly impacted due to fluid buildup, but the variation within a respiration cycle is expected to be much smaller.

In the case of significant air trapping, either due to obstruction of the airways (e.g., bronchitis) or due to the alveolar walls destruction (e.g., emphysema), capillary blood flow surrounding the alveoli will be significantly reduced, resulting in an increase of average value of RE. In addition, the modulation of RE within a respiration cycle also would be much higher due to increased modulation of the intrathoracic pressure and resultant increased modulation of the capillary blood flow. Other parameters such as RI and CE offer additional insights on the nature of the disease presentation.

Thus, by the parametric modeling of a wide band frequency response of the thorax, and by tracking these modeled parameters, both within a respiration cycle as well as averaged over several respiration cycles, key insights into the nature and extent of fluid accumulation, air trapping and ventilation dynamics may be obtained. As discussed above, an alert may be generated when a fluid score exceeds a pre-defined threshold, which may be indicative of onset of one or more conditions including, but not limited to, pulmonary edema, pleural effusion, and/or pericardial effusion, which may necessitate immediate clinical intervention through administration of diuretics, vasodilators, or non-invasive ventilation to remove congestion in the lungs.

In yet another aspect of the invention, an alert may be generated when extravascular impedance exceeds a pre-defined threshold, which may indicate either an excessive dehydration, e.g., in patients undergoing diuresis, dialysis for heart failure or renal failure patients and/or increase in PEEP (Positive End Expiratory Pressure) due to air-trapping in the lungs for patients with respiratory disorder. Appropriate therapies may include, but are not limited to, tapering the patient from diuretics, stopping the dialysis, and/or administering bronchodilators or non-invasive ventilation to open up the airways to relieve excess air-trapping. Patients with compromised heart/lung/kidney function also need to be monitored for possible deterioration, e.g., for conditions such as pulmonary edema. Patients who are on mechanical ventilation support are particularly at high risk when weaned off the ventilator. Embodiments of the present invention may provide a solution for such patients for monitoring thoracic fluid status and respiratory dynamics.

Figure 15:
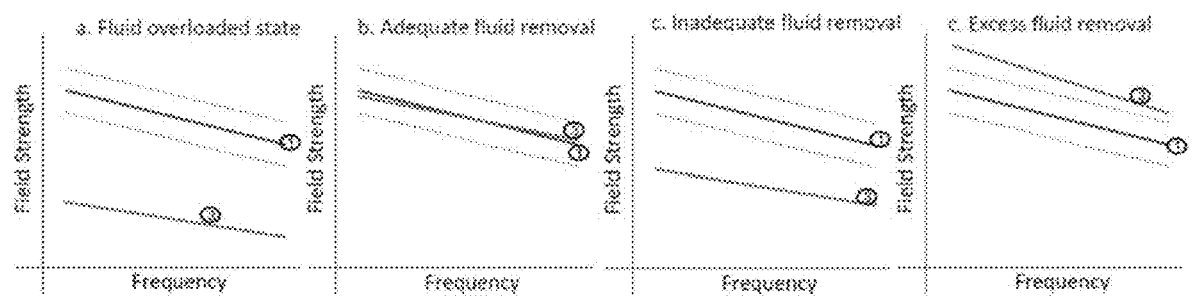
FIG. 15 is a series of graphical representations of fluid tracking output in an exemplary implementation of the non-invasive device in accordance with the principles of the present invention.

Turning to FIG. 15 a graphical representation corresponding to fluid tracking outputs from an embodiment of the system of the present invention. FIG. 15 depicts a field strength value as a function of injection current frequency for various states of a patient, i.e., a fluid overloaded state, an adequate fluid removal state, an inadequate fluid removal state, and an excess fluid removal state. A fluid state of a patient may be determined by using system 10 based on a present value of the field strength for the applied frequency. Further, as illustrated in FIG. 15, the line having indicia 1 depicts a healthy reference bodily response value with respect to applied frequency, based on a machine learning algorithm trained with data collected from a diverse group of healthy subjects. Dotted lines on either side of line 1 depict a band of bodily response values with respect to the applied frequency for which fluid status is considered normal. The line having indicia 3 depicts a current bodily response value of a patient with respect to applied frequency corresponding to patient fluid status measured by an embodiment of system 10. As further shown in FIG. 15, as fluid is removed from a fluid overloaded patient, the electrical field strength sensed by the device decreases and approaches the band surrounding line 1. Similarly, for dehydrated patients under IV saline infusion, the field strength sensed by system 10 increases, which may be used as a guide to effectively manage the patient's fluid levels.

As described above, the respiration signal may be derived from the modulation of the extravascular resistance (RE). The variation of RE over time is first filtered with a band pass filter with bandwidth from about 0.05 Hz to about 1 Hz. The choice of the corner frequencies of the filter can be changed according to the peak respiration rate being tracked. The variation of RE over time is also filtered with a band pass filter with a lower cutoff frequency of about 2 Hz and a higher cutoff frequency of about 10 Hz. The output of the second filter is not expected to carry any respiratory information, as respiration is limited to within 1 Hz frequency. However, the second filter can address artifacts such as sudden patient movements, cough, etc., where respiration signal may not be accurate. Based on the energy content of the second filter output, zones of disturbances in which the respiration signature is not accurate may be detected and lesser weight attributed to such zones when computing overall respiratory parameters.

Further, the output of the first filter may be passed through a peak detection algorithm to identify peaks and the troughs in the respiration signal. The difference between successive troughs and peaks corresponds to the tidal volume estimate, whereas the difference between the time of occurrence of neighboring peaks or troughs corresponds to the breath duration, the inverse of which is the respiration rate. The time difference between a trough to the next peak corresponds to the inhalation time, while the time difference between a peak to the next trough corresponds to the exhalation time. The ratio of these two is the Exhalation to Inhalation ratio (E2I ratio). The integrated tidal volume over a minute corresponds to the minute ventilation (MV). Other parameters, such as exhalation time constant and inhalation time constant, also may be computed from the respiratory curve. Statistical representative values of each of these parameters over a certain duration (e.g., a minute) constitute the overall respiratory parameters.

Figure 16A:
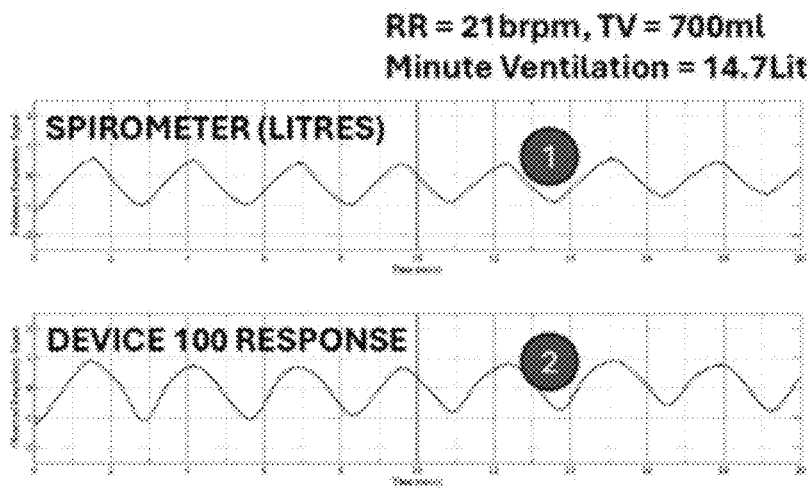
FIGS. 16A-16B are graphical representations of exemplary ventilation tracking outputs for an embodiment of a system configured in accordance with the principles of the present invention compared against a spirometer.
Figure 16B:
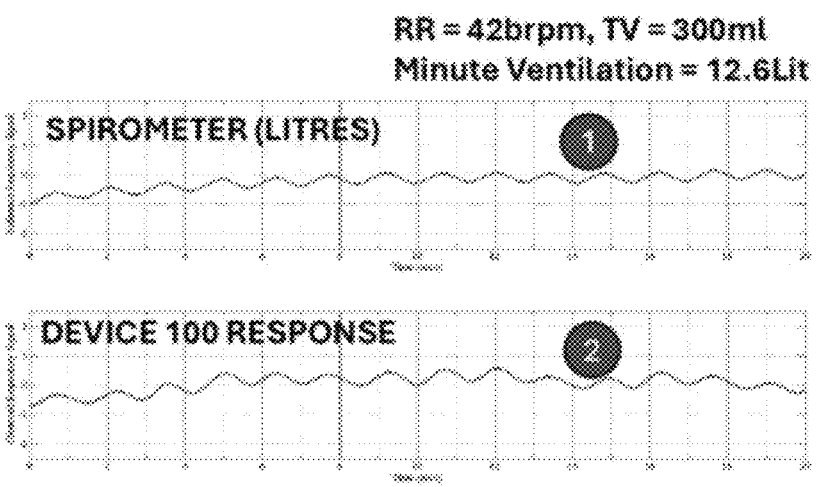

Referring to FIGS. 16A-16B, graphical representations of ventilation tracking by an embodiment of system 10, as compared to breathing through a spirometer, are described. FIGS. 16A-16B are a graphical representation of the output of system 10 and patch 20 compared to the air volume breathed by a subject using a spirometer. Two different levels of breathing are shown, in which FIG. 16A corresponds to deep breathing (tidal volume (TV) or volume per breath of 700 ml) at a moderate rate (RR=21 brpm) and FIG. 16B shows shallow breathing (TV of 300 ml) at a very high rate (RR=42 brpm). System 10, indicated as waveform 2 in both FIGS. 16A and 16B, tracks almost exactly the changes in air volume measured by the spirometer. Accordingly, the output of system 10 may be calibrated against the output of the spirometer or a similar device that measures air volume, to establish a calibration coefficient or the gain factor, between system 10 and the reference device. By applying this calibration coefficient, the output of system 10 may be used to display ventilation parameters such as minute ventilation in liters, even when corresponding actual air volume is not being measured for the patient. FIGS. 16A and 16B thus illustrate the capability of system 10 to be calibrated against ventilator settings to enable monitoring of minute ventilation in liters along with other parameters, even after the patient has been completely extubated.

Figure 17:
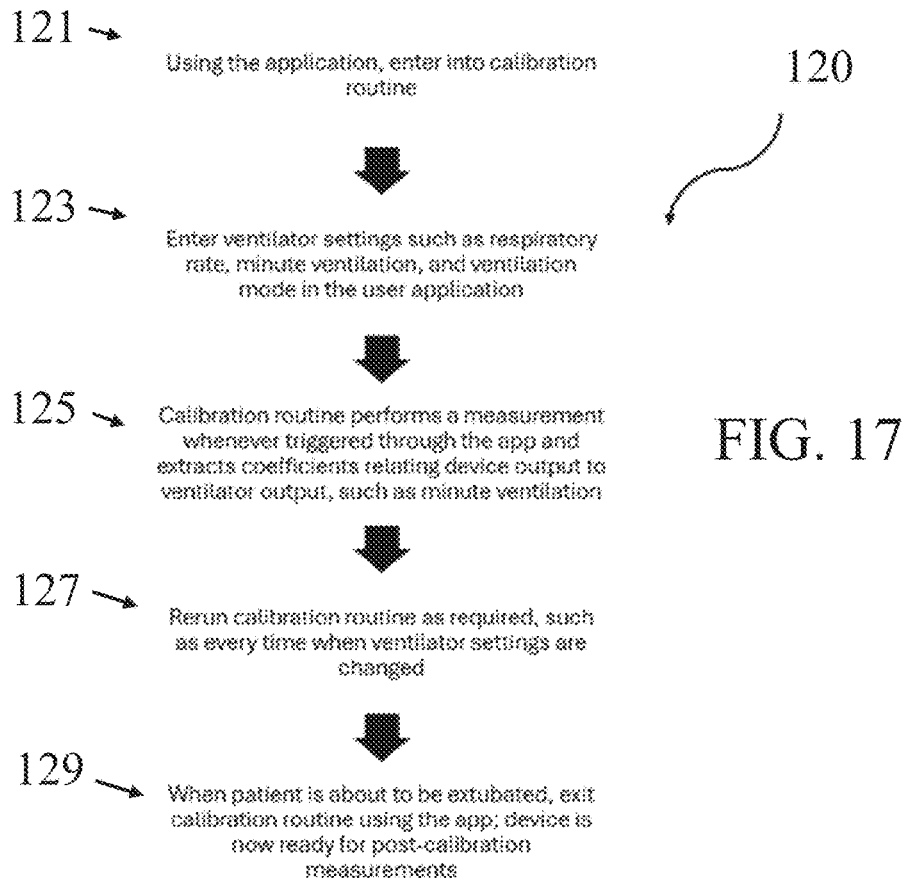
FIG. 17 illustrates a flowchart depicting a method for calibration workflow to be followed in an exemplary mechanical ventilator support scenario configured in accordance with the principles of the present invention.

Referring now to FIG. 17, flowchart 120 depicting a method of calibration workflow for an exemplary mechanical ventilator support scenario according to principles of the present invention is described. In particular, FIG. 17 shows an example method for calibrating minute ventilation to be followed by a clinician for an exemplary mechanical ventilator support scenario. Step 121 requires entering the ventilator parameters that will be used to calibrate the output of system 10 for a patient on mechanical ventilator support. Such ventilator parameters may include, but are not limited to, respiratory rate, minute ventilation, and ventilation mode. At step 123, a trigger may be initiated on external analysis unit 30 to calibrate the analysis algorithms to adopt ventilator support settings. At step 125, a predefined calibration routine may extract the calibration coefficients for system 10 and patch 20 to output data and ventilator parameters. At step 127, a recalibration process may be rerun to reflect alterations to the ventilator parameters. At step 129, the calibration routine is completed and patch 20 is ready for post-calibration measurements using the extracted calibration coefficients from steps 125 and 127.

Figure 18:
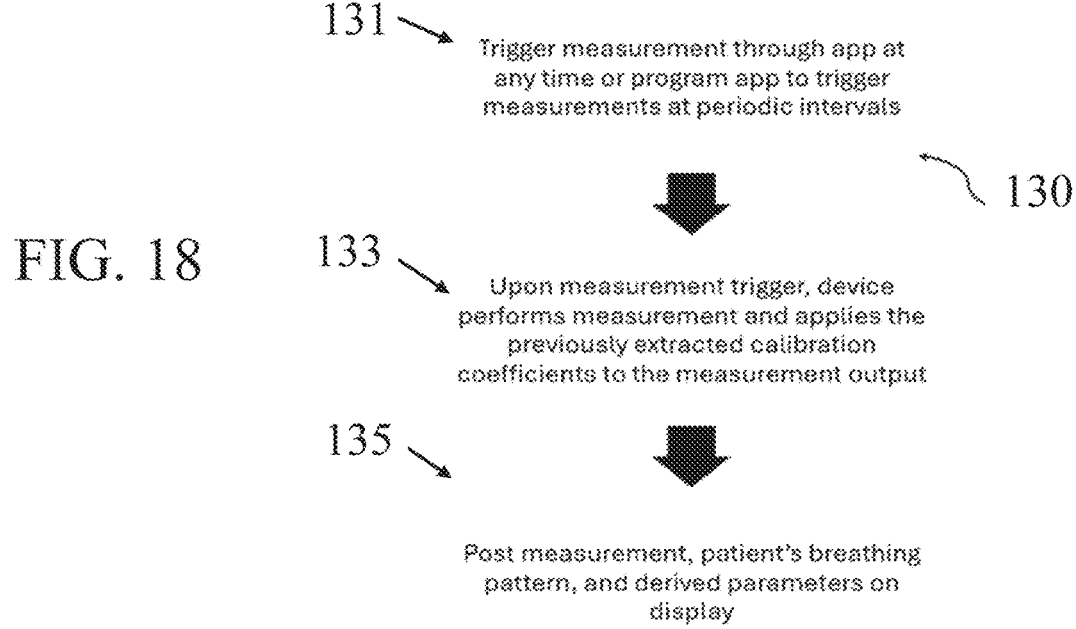
FIG. 18 illustrates a flowchart depicting a method for post-calibration workflow to be followed in monitoring a patient being extubated from mechanical ventilator support for a system configured in accordance with the principles of the present invention.

With respect to FIG. 18, flowchart 130 describing a method of post-calibration workflow to be followed in monitoring a patient being extubated from mechanical ventilator support is described. At step 131, after the patient has been extubated, a measurement may be triggered through activation of external analysis unit, e.g., an input selected on external analysis unit. The trigger may be invoked at any time, or the external analysis unit may be programmed to trigger measurements at periodic intervals. In a preferred embodiment, a clinician or care giver may periodically trigger measurements to provide periodic assessment of the patient's fluid status, air trapping status, and ventilation status. Depending on the criticality of the patient's condition, the treating clinician may set this interval between measurements. At step 133, system 10 is activated to start a measurement, whereby the system may perform the measurement and apply previously extracted calibration coefficients to the measurement output. After the measurement is complete, the calibration coefficients extracted through the steps outlined in flowchart 120 may be applied to compute the output variable in the same units as displayed in a mechanical ventilator. As an example, system 10 now can compute minute ventilation in actual liter units instead of only in relative electrical units. At step 135, the patient's breathing pattern may be displayed along with parameters such as respiratory rate and expiratory time using data captured using system 10. Accordingly, the patient's breathing pattern, along with derived parameters such as respiratory rate and expiratory time, may be displayed, and minute ventilation may be reported in liters.

As discussed above, electrical responses sensed by patch 20 are a function of fluid status of the patient. In general, the ventilation output from system 10 may depend on the actual ventilation status and the patient's fluid status. Calibration of the ventilation output of system 10 with respect to ventilator settings may need to be performed at different stages of fluid status to obtain more accurate calibration coefficients and subsequent accurate estimation of ventilation parameters corresponding to variation in the fluid status of the patient.

In yet another application of the present invention, system 10 may be interfaced to a dialyzer machine using wired or wireless network. As is known, a dialyzer machine removes fluid from patients suffering from renal failure or acute heart failure through ultra-filtration. In current practice, the ultra-filtration volume, or the amount of fluid that needs to be removed from the patient, is typically related to weight gain of the patient since a previous dialysis session. The ultra filtration rate may be calculated by the dialyzer machine using pre-defined algorithms. An embodiment of system 10 of the present invention can provide significant improvement in controlling ultrafiltration volume and rate using real time monitoring of thoracic fluid status. In particular, fluid status information output by system 10 may be input to the dialyzer machine to control the ultra-filtration volume and/or, rate to thereby ensuring minimal intra-dialytic complications as well as ensuring better fluid balance between dialysis sessions.

System 10 of the present disclosure offers significant advancements in monitoring patient health compared to previously known bioimpedance systems. Firstly, system 10 allows simultaneous assessment of thoracic fluid levels and ventilation status using a simple non-invasive patch worn on the chest. The inventive system therefore enables clinicians to make appropriate decisions, e.g., regarding how much IV fluids should be used to resuscitate a patient, how much diuretic dosage should be used, or what kind of ventilation support is required. Along with information from arterial blood gas (ABG) or pulse oximetry, system 10 also facilitates decisions regarding the extent of oxygen support required, without requiring multiple expensive imaging tests or invasive tools. Tracking of important respiratory indicators, like minute ventilation even when the patient has been extubated, allows close monitoring of a patient in the crucial 24-to-48-hour period post extubation, during which the patient condition could deteriorate and requiring re-intubation, even if only for monitoring. With system 10, re-intubation would be needed only when essential for treatment and not simply for monitoring.

Secondly, system 10 enables continuous monitoring of the quality of skin-electrode contact, thereby ensuring accurate readings and providing real-time feedback on when to change electrodes. This feature maintains reliability of the tissue responses and system outputs. Thirdly, by assessing the electrical properties of the thoracic region across a wide frequency range, a clinician can monitor fluid content more accurately than previously known systems, even considering the shape of the response over different frequencies. Additionally, system 10 and patch 20 may be calibrated using known references for fluid and ventilation levels, making the measurements even more precise for specific patient needs, such as those undergoing dialysis or mechanical ventilation.

System 10 as disclosed herein may be employed to facilitate treatment of various health conditions of a patient, of which the following are some exemplary use cases for various health conditions.

Management of Lung Congestion Due to Heart Failure or Renal Failure

Patients with heart failure and/or renal failure conditions tend to accumulate excess fluid in the circulatory system. In heart failure, a drop in cardiac output often leads to a drop in circulatory pressure. As a compensatory mechanism, the kidney maintains higher fluid levels in the body. In a renal failure, the kidney is incapable of removing excess fluid from the circulatory system, resulting in increased venous pressure and in right heart filling pressure, further increasing pulmonary pressure. Increased pulmonary pressure in turn causes fluid to leak from the pulmonary capillaries into the neighboring alveolar space, thus causing fluid accumulation in alveolar space, such that the affected alveoli can no longer efficiently participate in air exchange. A temporary drop in oxygen level may be compensated by increased ventilation (hyper ventilation) to the unaffected alveoli segments and an increased heart rate. The resulting increase in heart rate causes further increased pressure in the circulatory system, exacerbating the pulmonary pressure and pulmonary edema.

Beyond a threshold, as more alveoli segments are impacted, the patient experiences dyspnea (breathlessness).

Breathlessness is often confused as a symptom of an airway disorder or a pulmonary infection. In absence of an inexpensive and a rapid way to assess for fluid overload in lungs, these events often lead to misdiagnosis, delayed treatment, and poor outcomes.

System 10 as disclosed herein enables an easy and early detection of a fluid overload condition and enables non-invasive monitoring a patient's fluid status and ventilation status throughout the length of the treatment, which may include ambulatory monitoring. System 10 and patch 20 also may be used in conjunction to diagnose associated symptoms (e.g., effusions due to infectious etiology associated with fever) and/or an imaging modality (e.g., lung ultrasound to distinguish the presence of fluid in pleural space or alveolar space). System 10 also may enable clinicians to conduct a rapid and non-invasive diagnosis of a patient to detect fluid and then seamlessly monitor fluid and ventilation status during subsequent treatment.

Early Detection of Flash Pulmonary Edema (FPE)

Flash Pulmonary Edema (FPE) or Sympathetic Crashing Acute Pulmonary Edema (SCAPE) is a particularly dramatic and acute form of decompensated heart failure. Excessive sympathetic stimulation, secondary to a myocardial infarction or excessive activation of the renin-angiotensin system, are usually the trigger for acute fluid leakage from the pulmonary capillaries and flooding of alveoli within minutes. Patients with Acute Respiratory Distress Syndrome (ARDS) are also at a high risk of this condition due to already damaged capillaries and limited availability of functioning alveoli. Early detection and intervention with vasodilators and loop diuretics is critical to resolve this life-threatening condition, which has a mortality risk of greater than 40%. Non-invasive system 10 can monitor lung fluid status at frequent intervals at the bedside and trigger an alarm before excessive buildup of pulmonary edema, prompting immediate clinical intervention.

Fluid Management for Patients in Ventilation Support

Patients undergoing mechanical ventilation often need resuscitation via fluid administration to increase the circulatory pressure to improve venous return. However, it is critical not to overload such patients with excess fluid, which can lead to acute pulmonary edema. Accordingly, providing real-time monitoring of fluid status during the resuscitation phase is critical to maintaining correct fluid balance and hemodynamic stability. During weaning from mechanical ventilation, the excess fluid must be drained to prevent a sudden occurrence of pulmonary edema, e.g., as the pressure support from ventilator is lowered. Real time monitoring of fluid status during this stage is critical for successful ventilation weaning.

The ventilation status of patients on mechanical ventilation support may be accurately monitored by mechanical ventilator itself, which controls the volume of air breathed by the patient. However, once the patient is extubated, an accurate status of ventilation (respiration rate and respiration pattern, minute ventilation) is no longer available to the care team. As discussed above, however, system 10 of the present invention advantageously may be calibrated during the mechanical ventilation phase and then be used to monitor the ventilation status of the patients post-extubation. Additionally, system 10 can provide accurate information about minute ventilation status and other respiratory parameters along with an indication of fluid status, which is crucial to determine the subsequent treatment of the patient.

Sepsis Management

During sepsis shock, fluid from capillaries may leak into adjacent tissues due to increased porosity of blood vessels caused by an infection. This in turn leads to a sudden lowering of blood pressure. In such situations, patients need to be administered fluid (e.g., saline infusion) to maintain circulatory pressure. However, excess fluid infusion may lead to undesirable consequences such as pulmonary congestion. Advantageously, a system constructed in accordance with the principles of the present invention enables a real time monitoring of fluid status in the thoracic region leading to accurate titration of saline infusion and improved patient outcomes.

Fluid Management During Dialysis

During dialysis, patients undergo significant changes in fluid dynamics as ultrafiltrate is removed from the body and the patient's hemodynamic systems achieves a new equilibrium. As per existing techniques, the ultrafiltration volume typically is based on weight increase from a prior dialysis session, with the rate titrated based on pre-defined algorithms and periodic blood pressure measurements or by monitoring patient symptoms (such as cramps). System 10 of the present invention offers real time fluid status and can facilitate titrate ultrafiltration volume and rate. For example, fluid status data monitored by patch 20 and external analysis unit 30 of the present invention may be used as an input to a dialyzer machine to control ultrafiltration volume and rate and include a setpoint to cease dialysis when system 10 indicates that the patient is becoming dehydrated. System 10 also may be used for home monitoring of patients undergoing dialysis to assess fluid status, as indicated above with respect to FIG. 15.

Detection of Pleural Effusion

Pleural effusion from either infectious etiology (e.g., pneumonia) or non-infectious etiology may be readily detected using an embodiment of the present invention. Patch 20 may be developed as a small form factor device to facilitate identifying a specific region of fluid accumulation in pleura to monitor such events.

Fluid Management for Patients Post Trauma

Patients who have recently undergone trauma (high risk surgery, PTCA or, an acute myocardial infarction) are prone to develop pulmonary edema. System 10 as disclosed herein advantageously may be employed to monitor the patients during the recovery process.

Detection of Ascites in Liver Cirrhosis/Cancer Patients

System 10 further may be used to facilitate detection ascites accumulation, especially in liver cirrhosis/cancer patients. Ascites often presents as a buildup of excess fluid in the abdominal area, particularly around liver, which could be readily detected by placing patch 20 in the abdominal area, above the liver. Of course, the electrical equivalent model, such as described above for FIG. 2B, would need to take into account modeling of the corresponding region of the thorax, and training of the machine learning system and personalization of the model would be conducted on patient data specific to ascites.

Detecting and Differentiating Right Sided and Left Sided Heart Failure

System 10 of the present invention may further facilitate differentiating right sided and left sided heart failure by monitoring of fluid scores near the liver site (as discussed immediately above) and for the entire thoracic region. Right-sided heart failure leads to excess fluid buildup in the veins and peripheral organs, with the liver being particularly affected, causing acute hepatomegaly. Right-sided failure alone may not lead to pulmonary edema. Monitoring fluid status around the liver region using system 10 may detect an increased fluid score reflecting acute right-sided heart failure. On the other hand, left sided heart failure leads to acute pulmonary edema, often without affecting the peripheral organs or liver. Monitoring the thoracic region using system 10 may exhibit a high fluid score. Thus, monitoring around the liver and thoracic region using system 10 may lead to detection and differentiation of right vs. left sided heart failure. In the event of simultaneous right-sided and left-sided failure, the thoracic region as well as the region around liver will exhibit an increased fluid score. Accordingly, in some embodiments, a pair of patches 20 can be used with external analysis unit 30 for simultaneous monitoring of the liver and thoracic regions.

Sleep Monitoring

System 10, with its ability to simultaneously assess fluid score and ventilation status, may be used in sleep monitoring in conjunction with other supporting modalities. For example, ventilation status assessment using system 10 may be useful in monitoring hypo apneic events and apnea events during sleep. Fluid movements during sleep from peripheral organs to the thoracic region also can be tracked using system 10.

Monitoring of Edema in Surgical Sites

System 10 may be placed adjacent a surgical site post-surgery to monitor fluid status (edema) at the surgical site. Such real-time detection and tracking of edema at surgical sites would allow early intervention in case of infection or post-surgical edema.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the principles of the present invention. Accordingly, the appended claims are intended to include within their scope such processes, machines, manufacture, compositions of matter, means, methods, or steps.

What is claimed is:

1. A system for monitoring fluid and ventilation status of a patient, the system comprising: a patch having an adhesive layer configured to be disposed non-invasively on skin of a patient; at least four electrodes disposed on the adhesive layer, the at least four electrodes configured to contact the skin;
    an electronics unit configured to be removably coupled to a feature on the patch, the electronics unit having a communications component and configured to apply an electrical stimulus simultaneously at a plurality of frequencies in a range up to and including 4.92 MHz through respective pairs of the at least four electrodes and generate a composite response corresponding to a weighted combination of a plurality of responses simultaneously measured by the respective pairs at each of the plurality of frequencies; and
    an external analysis unit having an associated display screen, the external analysis unit configured to receive the composite response via the communications component, the external analysis unit programmed to execute analysis algorithms corresponding to an equivalent electrical model personalized by machine learning algorithms trained on a dataset from a patient population having diverse physiologic characteristics,
    wherein the display screen displays information reflecting the fluid and ventilation status of the patient computed by the analysis algorithms based on the composite response, and
    wherein parameters of the equivalent electrical model are selected from the group comprising an extravascular resistance and capacitance structure, an intravascular resistance and capacitance structure, and a capacitive membrane separating the extravascular and intravascular regions.

2. The system of claim 1, wherein the plurality of the responses is corrected for known parasitic effects using calibration parameters determined a priori.

3. The system of claim 2, wherein the plurality of corrected responses is used to continuously monitor a corrected composite response of bodily tissues and contact impedances of each of the at least four electrodes at each of the plurality of frequencies.

4. The system of claim 3, wherein the corrected composite response of the bodily tissues at each of the plurality of frequencies is further corrected with obtained values of contact impedances at each of the plurality of frequencies.

5. The system of claim 1, wherein the display screen displays information comprising at least one of a fluid score of the patient and respiration parameters of the patient.

6. The system claim 5, wherein the respiration parameters comprise one or more of respiration rate, minute ventilation, tidal volume, rapid shallow breathing index, inspiratory and expiratory (I and E time, I to E ratio and expiratory time constant.

7. The system of claim 1, wherein the electronics units is removably coupled through the at least four electrodes via the molded feature.

8. The system of claim 1, wherein the patch is battery-operated.

9. The system of claim 1, wherein the external analysis unit comprises a WiFi or cellular telephony module.

10. The system of claim 9, wherein the external analysis unit comprises a mobile phone, a tablet, a purpose-built device, an external patient monitor, and/or is a component of existing medical equipment.

11. The system of claim 9, wherein the machine learning algorithms and dataset that are used to personalize the equivalent electrical model reside on a server, and the external analysis unit communicates with the server via the WiFi or cellular telephony module.

12. The system to claim 11, wherein the external analysis unit and the server communicate when the patch is applied to the patient and initially activated.

13. The system to claim 12, wherein the external analysis unit and the server periodically communicate after the patch is applied to the patient and activated.

14. The system of claim 1, wherein the external analysis unit includes an input capability to input patient data used by the machine learning algorithms to personalize the equivalent electrical model, the input patient data selected from the group consisting of: height, weight, sex, age, body fat content, chest circumference, identification of current co-morbidities or relevant medical conditions and historical medical background information.

15. The system of claim 1, wherein the electrical stimulus comprises the plurality of frequencies combined with a pre-determined amplitude and phase for each of the plurality of frequencies.

16. The system of claim 1, wherein the electrical stimulus has a pre-defined coherence length.

17. The system of claim 1, wherein the system is designed to accept user inputs for thresholds for contact impedances of the at least four electrodes and for fluid score and respiration parameters.

18. The system of claim 1, wherein the analysis algorithms are trained to automatically compute thresholds and to generate an alert when at least one of the thresholds is breached.

19. A method of monitoring fluid and ventilation status of a patient, the method comprising:
- providing a patch having an adhesive layer configured to be disposed non-invasively on skin of a patient, the patch having an electronics unit configured to be removably coupled to a molded feature on the adhesive layer, the electronics unit including a communications module component, the patch comprising at least four electrodes configured to contact the skin, and an external analysis unit having an associated display screen;
- applying the patch to the skin of the patient;
- activating the electronics unit to apply an electrical stimulus simultaneously at a plurality of frequencies in a range up to and including 4.92 MHz through respective pairs of the at least four electrodes;
- generating in the electronics unit a composite response corresponding to a weighted combination of a plurality of responses simultaneously measured by the respective pairs at each of the plurality of frequencies;
- sending the composite response via the communications module component to the external analysis unit;
- computing on the external analysis unit, based on the composite response and analysis algorithms, a continuous value of contact impedance for each of the plurality of electrodes; and
- continuously displaying on the display screen of the external analysis unit the contact impedance of each of the plurality of electrodes;
- computing on the external analysis unit, based on the composite response and analysis algorithms personalized for the patient, information reflecting a fluid score and a ventilation status of the patient; and
- displaying on the display screen of the external analysis unit the information reflecting the fluid score and the ventilation status of the patient,
- wherein, responsive to activation of the electronics unit, the analysis algorithms personalized for the patient corresponding to an equivalent electrical model personalized by machine learning algorithms trained on a dataset from a healthy patient population having diverse physiologic characteristics, are installed on the external analysis unit, and
- wherein parameters of the equivalent electrical model are selected from the group comprising an extravascular resistance and capacitance structure, an intravascular resistance and capacitance structure, and a capacitive membrane separating the extravascular and intravascular regions.

20. The method of claim 19, wherein the equivalent electrical model is adjusted to correct for known parasitic effects of the patch using calibration parameters determined a priori.

21. The method of claim 19, wherein the information displayed on the display screen corresponds to the composite response of bodily tissues and the contact impedance of each of the at least four electrodes at each of the plurality of frequencies.

22. The method of claim 19, wherein the display screen displays information comprising at least one of the fluid score of the patient and respiration parameters of the patient.

23. The method of claim 22, wherein the respiration parameters comprise one or more of respiration rate, minute ventilation, tidal volume, rapid shallow breathing index, inspiratory and expiratory (I and E) time, I to E ratio and expiratory time constant.

24. The method of claim 19, wherein the external analysis unit sends the composite response from the electronics unit to the external analysis unit using Bluetooth or a near-field transmission technology.

25. The method of claim 19, wherein personalization of the analysis algorithms is performed by using machine learning algorithms and dataset that reside on a server, and the external analysis unit communicates with the server via the WiFi or cellular telephony module.

26. The method of claim 25, wherein the external analysis unit and the server communicate when the patch is applied to a patient and initially activated.

27. The method of claim 26, wherein the external analysis unit and the server periodically communicate after the patch is applied to a patient and activated.

28. The method of claim 19, wherein the external analysis unit includes an input capability; the method further comprising inputting patient data used by the machine learning algorithms to personalize the equivalent electrical model, wherein the input patient data is selected from the group consisting of: height, weight, sex, age, body fat content, chest circumference, identification of current co-morbidities or relevant medical conditions and historical medical background information.

29. The method of claim 19, wherein the analysis algorithms generate an alert when a threshold is breached, the method further comprising manifesting the alert on the external analysis unit.

30. The method of claim 19, wherein the analysis algorithms generate an alert when the value of the contact impedance for at least one of the plurality of electrodes breaches a defined threshold.

* * * * *